(12) United States Patent
Adachi et al.

(10) Patent No.: US 9,317,806 B2
(45) Date of Patent: Apr. 19, 2016

(54) INFORMATION PROCESSING DEVICE AND METHOD, ATTENTION LEVEL-CALCULATING DEVICE, AND COMPUTER READABLE MEDIUM

(75) Inventors: Tatsuya Adachi, Ichinomiya (JP); Ryosuke Kono, Ichinomiya (JP); Mitsunori Sugiura, Ichinomiya (JP)

(73) Assignee: OMRON CORPORATION, Kyoto-shi (JP)

( * ) Notice: Subject to any disclaimer, the term of this patent is extended or adjusted under 35 U.S.C. 154(b) by 296 days.

(21) Appl. No.: 14/128,978

(22) PCT Filed: Mar. 14, 2012

(86) PCT No.: PCT/JP2012/056586
§ 371 (c)(1),
(2), (4) Date: Dec. 26, 2013

(87) PCT Pub. No.: WO2013/011714
PCT Pub. Date: Jan. 24, 2013

(65) Prior Publication Data
US 2014/0129487 A1 May 8, 2014

(30) Foreign Application Priority Data

Jul. 15, 2011 (JP) .................................. 2011-157036

(51) Int. Cl.
*G06N 5/02* (2006.01)
*G07F 17/32* (2006.01)

(52) U.S. Cl.
CPC .............. *G06N 5/02* (2013.01); *G07F 17/3206* (2013.01); *G07F 17/3234* (2013.01); *G07F 17/3239* (2013.01); *G07F 17/3251* (2013.01)

(58) Field of Classification Search
None
See application file for complete search history.

(56) References Cited

U.S. PATENT DOCUMENTS

2005/0209008 A1* 9/2005 Shimizu .................. A63F 13/10
463/43
2008/0109397 A1* 5/2008 Sharma .................. G06Q 30/02
(Continued)

FOREIGN PATENT DOCUMENTS

JP 2004-065689 A 3/2004
JP 2004-195013 A 7/2004
(Continued)

OTHER PUBLICATIONS

Calderara et al, Multimedia Surveillance: Content-based Retrieval with Multicamera People Tracking, 2006.*
(Continued)

*Primary Examiner* — Stanley K Hill
*Assistant Examiner* — Mikayla Chubb
(74) *Attorney, Agent, or Firm* — Nutter McClennen & Fish LLP; John J. Penny, Jr.

(57) ABSTRACT

A DB registration-updating unit registers, in a patron management DB, the behavior history of each player in association with camera IDs that identify the cameras that have captured images of the player. On the basis of information in the patron management DB, a potential player-determining unit considers a player, whose length of stay in a specific corner is longer than a prescribed period and who is not playing, to be a potential player who wants to play but is unable to play. An attention level DB management unit registers, in an attention level DB, the points proportional to the lengths of stay of potential players in said corner as the attention level by cumulatively storing the points for each game console. An attention level display control unit displays the information on the players' attention level that is registered in the attention level DB.

9 Claims, 20 Drawing Sheets

(56) References Cited

U.S. PATENT DOCUMENTS

2008/0151049 A1* 6/2008 McCubbrey ..... G08B 13/19641
 348/143
2009/0298514 A1* 12/2009 Ullah ........................ G01S 5/02
 455/456.5

FOREIGN PATENT DOCUMENTS

| JP | 2006-055183 A | 3/2006 |
| JP | 2008-125732 A | 6/2008 |

OTHER PUBLICATIONS

Petrushkin et al, Multiple Sensor Indoor Surveillance: Problems and Solutions, 2005.*
Teixeira et al, A Survey of Human-Sensing: Methods for Detecting Presence, Count, Location, Track, and Identity, 2010.*
Yang et al, Counting People in Crowds with a Real-Time Network of Simple Image Sensors, 2003.*
International Search Report for Application No. PCT/JP2012/056586, issued Jun. 5, 2012.

* cited by examiner

Fig. 13

| Person ID | Face image |
|---|---|
| 1 | ☺ |
| 2 | ☺ |
| 3 | ☺ |

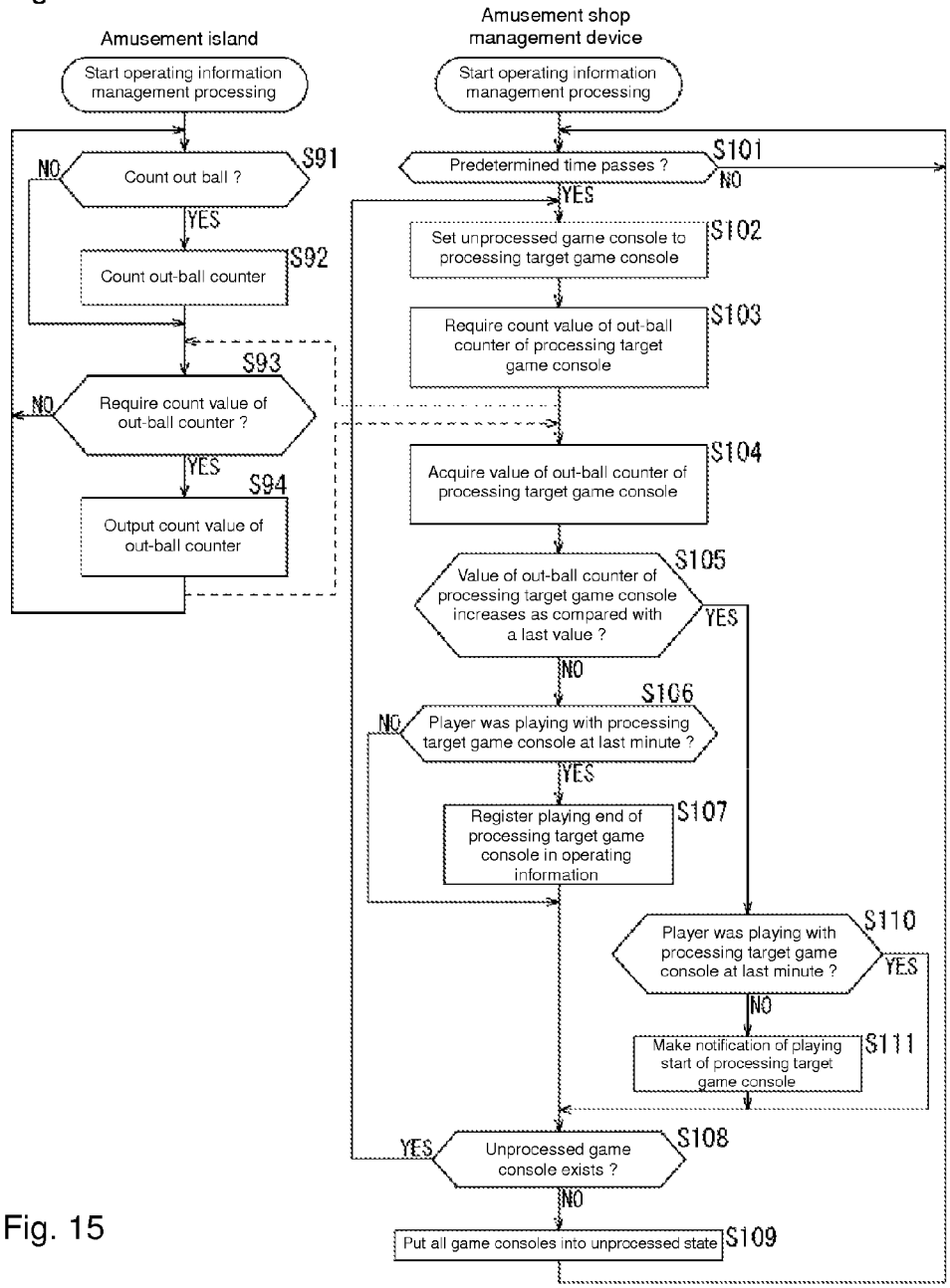

Fig. 17

| Camera ID | Area | Detail | Model | Area information |
|---|---|---|---|---|
| C1 | First island facility | Entry | --- | One-yen area |
| C2 | First island facility | Exit | --- | One-yen area |
| C3 | First island facility | Console having number of 1 | XXXXX | One-yen area |
| C4 | First island facility | Console having number of 2 | XXXXX | One-yen area |
| C5 | Second island facility | Entry | --- | Four-yen area |
| C6 | Second island facility | Exit | --- | Four-yen area |
| C7 | Second island facility | Console having number of 3 | YYYYY | Four-yen area |

Fig. 18

| Person ID | Clock time | Area movement history |
|---|---|---|
| P1 | 10:00 on October 1, 2010 | First island facility – in |
| P1 | 10:06 on October 1, 2010 | First island facility – out |
| P1 | 10:30 on October 1, 2010 | Second island facility – in |
| P1 | 10:50 on October 1, 2010 | Start play on console having number of 001 |
| P1 | 12:00 on October 1, 2010 | Second island facility – out |
| P2 | 14:00 on October 1, 2010 | First island facility – in |
| P2 | 14:02 on October 1, 2010 | Start play on console having number of 001 |
| P2 | 16:00 on October 1, 2010 | First island facility – out |

Fig. 19

| Date | Console number | Attention level | Number of people |
|---|---|---|---|
| 2011. 1. 1 | 001 | 154 | 51 |
| | 002 | 841 | 180 |
| | 003 | 256 | 39 |
| | 004 | 372 | 119 |

INFORMATION PROCESSING DEVICE AND METHOD, ATTENTION LEVEL-CALCULATING DEVICE, AND COMPUTER READABLE MEDIUM

CROSS-REFERENCE TO RELATED APPLICATION(S)

This application claims the benefit of priority from Japanese Patent Application No. 2011-157036, filed on 15 Jul. 2011, and International Application No. PCT/JP2012/056586, filed on 14 Mar. 2012 and designating the United States, the entire contents of which is incorporated herein by reference for all purposes.

BACKGROUND

The present invention relates to an information processing device and method, an attention level calculating device, and a computer readable medium storing a program, and particularly to an information processing device and method, an attention level calculating device and a computer readable medium storing a program for obtaining an attention level of each model of a game console in an amusement shop or each model installed in an island facility from amusement information on a potential player who wants to play with the model but cannot play.

Player numbers are decreasing in an environment in which an amusement shop is placed. In order to keep the regular player who visits one's own amusement shop, to secure a new player who has not visited one's own amusement shop, and to differentiate one's own amusement shop from surrounding amusement shops, there is a strong competition to secure the players by an effort such as replacement of a game console and an event.

Examples of the effort includes (1) a medium such as a membership card is issued, (2) the player is encouraged to use the membership card when visiting the amusement shop, (3) a trend of the player is recognized from a usage situation of the membership card, and (4) based on the trend (visiting data) of the player, effectiveness of the event is studied to reflect a study result in service of an operating staff. The securement of the regular player and acquisition of the new player are planned through the effort.

However, in the effort in which the medium is used, although the issuance of the membership card is going well, the trend (visiting data) of the player cannot accurately be understood because some players do not bring the membership card or because some players do not insert the membership card even if the player brings the membership card, and the trend of the player is not reflected in the effectiveness of the event or the service of the operating staff.

In order to solve the problem, there is biometrics, particularly a face authentication system that does not use the medium.

As typified by an application such as a mobile phone and a gate for entry and exit, with wide spread of a camera that is of an image capturing unit and with the progress of performance of the face authentication system in one-on-one situation, the player can individually be identified in the amusement shop.

Therefore, a hurdle to use the medium that is of the problem of the membership card has been eliminated, and the player is identified to understand how the player plays with each game console using the cameras installed in the amusement shop and each game console.

The understanding of the trend (data) of the player can be reflected in the effectiveness of the event or the service of the operating staff for the purpose of the securement of the regular player or the acquisition of the new player.

For example, a technology for calculating the operating rate of the game console using a membership recording medium has been proposed as the technology for understanding the trend of the player (see Patent Document 1, Japanese Unexamined Patent Publication No. 2004-195013).

Nowadays, in the amusement shop, replacement timing of the game console is decided from an average operating rate of a model of the game console or the whole island, and the average operating rate is obtained by the technology.

However, if the replacement is determined based on the operating rate of the game console, the replacement is decided in a state in which the potential player to be the player who wants to play but cannot play is not taken into consideration. Accordingly, the player does not play although the replacement is actually performed, and therefore sometimes the operating rate of the game console decreases after the replacement.

The present invention has been devised in consideration of the situation, and particularly, is directed to obtain an attention level of the potential player who cannot play with the desired game console in order to obtain the operating rate in each model in an amusement shop, thereby examining the replacement of the game console which takes the potential player into consideration.

SUMMARY

An information processing device in accordance with a first aspect of at least one embodiment of the present invention comprises a game console image capturing unit configured to capture an image of a player who plays with a game console at each game console installed in an amusement shop, an area image capturing unit configured to capture the image of the player who enters or exits an area where a plurality of game consoles is provided or an island facility in units of areas or island facilities, a matching unit configured to match the player with a registrant, the player being captured in the images by the game console image capturing unit and the area image capturing unit, an entry management unit configured to manage an entry clock time of each area for each player who is matched by the matching unit, an exit management unit configured to manage an exit clock time of each area for each player who is matched by the matching unit, a play starting management unit configured to manage a play starting clock time of each game console for each player matched by the matching unit, a potential player determining unit configured to determine whether the player whose entry is managed by the entry management unit and who is matched by the matching unit is a potential player who wants to play with a model of a game console installed in the area but cannot play, based on the play starting clock time of the player which is managed by the play starting management unit, and an attention level calculator configured to calculate an attention level of the game console which is a predetermined model of the game console installed in the amusement shop based on information about the entry clock time and the exit clock time of the player determined as the potential player by the potential player determining unit for the predetermined model.

BRIEF DESCRIPTION OF THE DRAWINGS

FIG. 13 is a chart illustrating a configuration example of a visitor DB.

FIG. 14 is a flowchart illustrating operating information management processing.

FIG. 15 is a chart illustrating a configuration example of an operating information DB.

FIG. 17 is a chart illustrating a configuration example of a console allocation DB.

FIG. 18 is a chart illustrating a configuration example of a patron management DB.

FIG. 19 is a chart illustrating a configuration example of an attention level DB.

DETAILED DESCRIPTION

Figure 1:
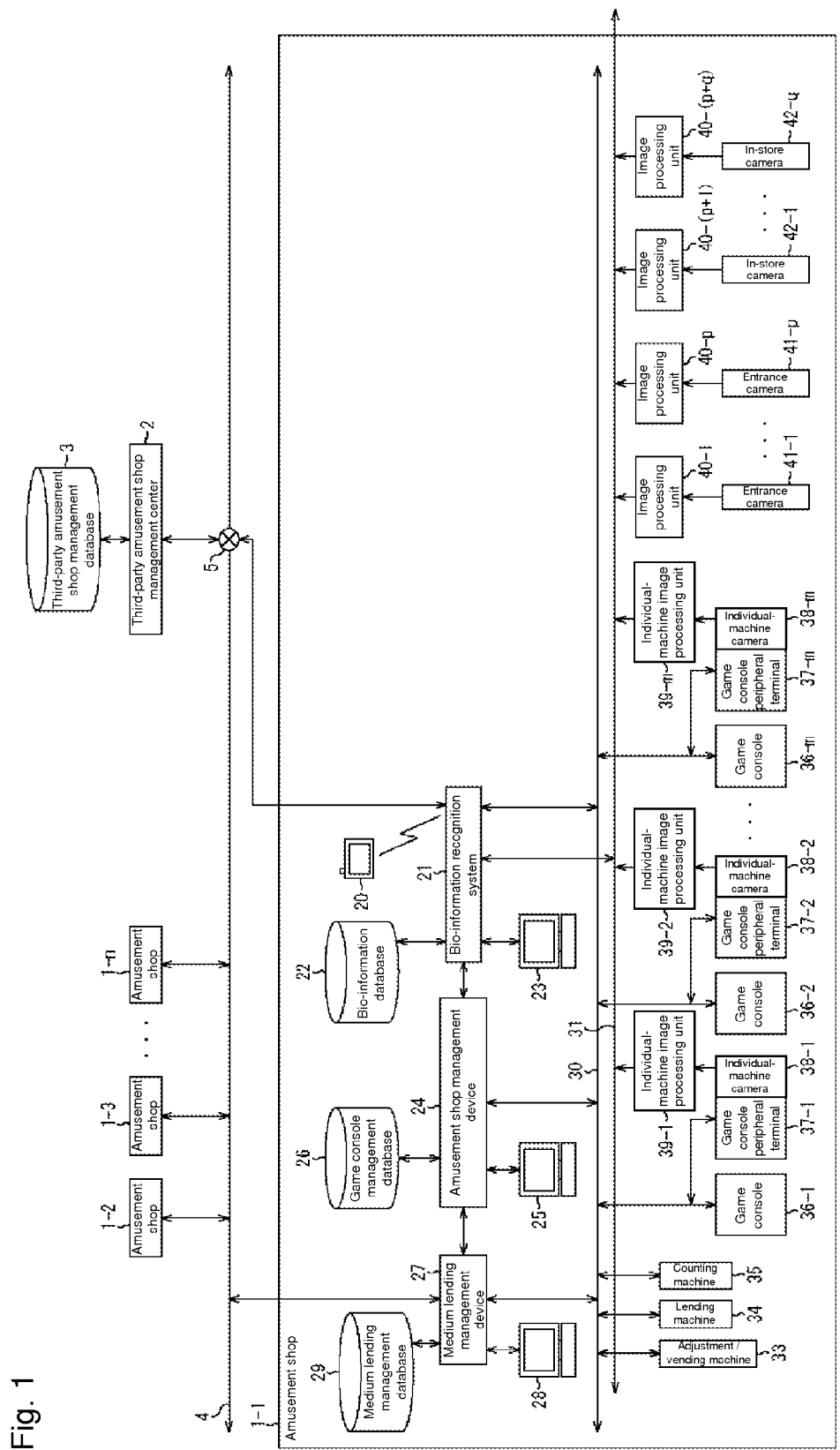
FIG. 1 is a diagram illustrating a configuration of a monitoring system according to an embodiment of the present invention.

Embodiments of the present invention are described below. A correspondence relationship between a constituent of the present invention and an embodiment of the present invention is illustrated as follows. The following mention is made to check the fact that embodiments of the present invention are described in modes for carrying out the invention. Even if an embodiment that is not described in the mention but described in the description exists as the embodiment corresponding to the constituent of the present invention, it does not mean that the embodiment that is not described in the mention but described in the description does not correspond to the constituent. On the other hand, even if the description that the embodiment corresponds to the constituent is made, it does not mean that the embodiment does not correspond to other constituents except the constituent.

That is, an information processing device in accordance with one aspect of at least one embodiment of the present invention includes a game console image capturing unit (for example, an individual-machine camera 38 in FIG. 9) configured to capture an image of a player who plays with a game console at each game console installed in an amusement shop, an area image capturing unit (for example, an in-store camera 42 in FIG. 9) configured to capture the image of the player who enters or exits an area where a plurality of game consoles is provided or an island facility in units of areas or island facilities, a matching unit (for example, a matching unit 293 in FIG. 9) configured to match the player with a registrant, the player being captured in the images by the game console image capturing unit and the area image capturing unit, an entry management unit (for example, an area entry management unit 275a in FIG. 9) configured to manage an entry clock time of each area for each player who is matched by the matching unit, an exit management unit (for example, an area exit management unit 275b in FIG. 9) configured to manage an exit clock time of each area for each player who is matched by the matching unit, a play starting management unit (for example, a play starting management unit 275c in FIG. 9) configured to manage a play starting clock time of each game console for each player matched by the matching unit, a potential player determining unit (for example, a potential player determining unit 275e in FIG. 9) configured to determine whether the player whose entry is managed by the entry management unit and who is matched by the matching unit is a potential player who wants to play with a model of a game console installed in the area but cannot play, based on the play starting clock time of the player which is managed by the play starting management unit, and an attention level calculator (for example, an attention level DB management unit 275g in FIG. 9) configured to calculate an attention level of the game console which is a predetermined model of the game console installed in the amusement shop based on information about the entry clock time and the exit clock time of the player determined as the potential player by the potential player determining unit for the predetermined model.

It is possible to further include a stay time calculator (for example, a stay time calculator 275f in FIG. 9) configured to calculate a stay time of the area for each player who is matched by the matching unit based on the entry clock time and the exit clock time, and the potential player determining unit can determine the player as the potential player when the stay time in the area of the player is longer than a predetermined time and the play starting clock time is not registered within the stay time in the area of the player.

It is possible to include a display unit (for example, a display unit 25 in FIG. 9) configured to display, on a unit of the predetermined model or a predetermined area unit, the attention level of the game console to be the predetermined model calculated by the attention level calculator.

It is possible to further include a detector (for example, a game console signal management unit 271 in FIG. 9) configured to detect an out ball in each game console, and the play starting management unit can be caused to manage the play starting clock time of each game console for each player who is matched by the matching unit in such a manner that the detector detects a change of an out ball from a non-presence state to a presence state.

An information processing method and a non-transitory computer readable medium storing a program in accordance with one aspect of at least one embodiment of the present invention include a game console image capturing step (for example, Step S11 in FIG. 10) of capturing an image of a player who plays with a game console at each game console installed in an amusement shop using a game console image capturing unit configured to capture the image of the player who plays with the game console at each game console installed in the amusement shop, an area image capturing step (for example, Step S31 in FIG. 11) of capturing the image of the player who enters or exits an area where a plurality of game consoles is provided or an island facility, in units of areas or island facilities using an area image capturing unit configured to capture the image of the player who enters or exits the area where the plurality of game consoles is provided or the island facility in units of areas or island facilities, a matching step (for example, Steps S64 to S72 in FIG. 12) of matching the player with a registrant, the player being captured in the images through processing of the game console image capturing step and processing of the area image capturing step using a matching unit configured to match the player with the registrant, the player being captured in the images by the game console image capturing unit and the area image capturing unit, an entry management step (for example, Steps S126 and S127 in FIG. 16) of managing an entry clock time of each area for each player who is matched through processing of the matching step using an entry management unit configured to manage the entry clock time of each area for each player who is matched by the matching unit, an exit management step (for example, Steps S128 and S133 in FIG. 16) of managing an exit clock time of each area for each player who is matched by processing of the matching step using an exit management unit configured to manage the exit clock time of each area for each player who is matched by the matching unit, a play starting management step (for example, Steps S123 to S125 in FIG. 16) of managing a play starting clock time of each game console for each player matched by processing of the matching step using a play starting management unit configured to manage the play starting clock time of each game console for each player matched by the matching unit, a potential player determination step (for example, Steps S129 to S131 in FIG. 16) of determining whether the player whose entry is managed by the processing of the entry management step and who is matched by the processing of the matching unit is a potential player who wants to play with a model of a game console installed in the area but cannot play, based on the play starting clock time of the player which is managed by the processing of the play starting management step using a potential player determining unit configured to determine whether the player whose entry is managed by the entry management unit and who is matched by the matching unit is the potential player who wants to play with the model of the game console installed in the area but cannot play, based on the play starting clock time of the player which is managed by the play starting management unit, and an attention level calculation step (for example, Steps S131 and S132 in FIG. 16) of calculating an attention level of the game console which is a predetermined model of the game console installed in the amusement shop based on information about the entry clock time and the exit clock time of the player determined as the potential player by the processing of the potential player determination step for the predetermined model using an attention level calculator configured to calculate the attention level of the game console which is the predetermined model of the game console installed in the amusement shop based on the information about the entry clock time and the exit clock time of the player determined as the potential player by the potential player determination unit for the predetermined model.

[Configuration Example of Monitoring System of Embodiment]

FIG. 1 is a diagram illustrating a configuration example of a monitoring system according to an embodiment using the information processing device of the present invention.

[Configuration Example of Monitoring System]

Amusement shops 1-1 to 1-n are what are called pachinko parlors, pachisuro (a slot machine in the pachinko parlor) parlors, or casinos. The amusement shops 1-1 to 1-n are also affiliated stores or member stores of a bio-information management center or a third-party amusement shop management center. In the amusement shops 1-1 to 1-n, a plurality of stores needed to be integrally managed. The amusement shops 1-1 to 1-n are connected to one another by a third-party amusement shop management bus 4. The amusement shops 1-1 to 1-n transmit and receive third-party amusement shop management information to and from one another through the bus 4 and a public communication line network 5 typified by the Internet. Hereinafter, the amusement shops 1-1 to 1-n are simply referred to as an amusement shop 1 unless otherwise noted. It is assumed that the same holds true for other configurations.

The third-party amusement shop management bus 4 acts as a transmission line through which the medium lending management information mainly managed by a medium lending management device 27 of each amusement shop 1 flows.

A third-party amusement shop management center 2 is a server that is used by a business operator who manages and operates the third-party amusement shop management center. The third-party amusement shop management center 2 updates a DB including medium lending management information, which is managed in a third-party amusement shop management database (DB) 3, based on information supplied from each amusement shop 1, and distributes the updated latest medium lending management information to the medium lending management device 27 of each amusement shop 1.

A bio-information recognition system 21 matches a face image, which is extracted from an image captured by individual-machine cameras 38-1 to 38-m, entrance cameras 41-1 to 41-p, and in-store cameras 42-1 to 42-q with individual-machine image processing units 39-1 to 39-m and image processing units 40-1 to 40-(p+q) and supplied through a bio-information bus 31, with a face image previously registered in a bio-information DB 22. When the face images are matched with each other, the bio-information recognition system 21 notifies a mobile terminal 20 that a registered player visits the store, or displays the visit of the registered player on a display unit 23 including an organic EL (Electro Luminescence) or an LCD (Liquid Crystal Display).

Figure 9:
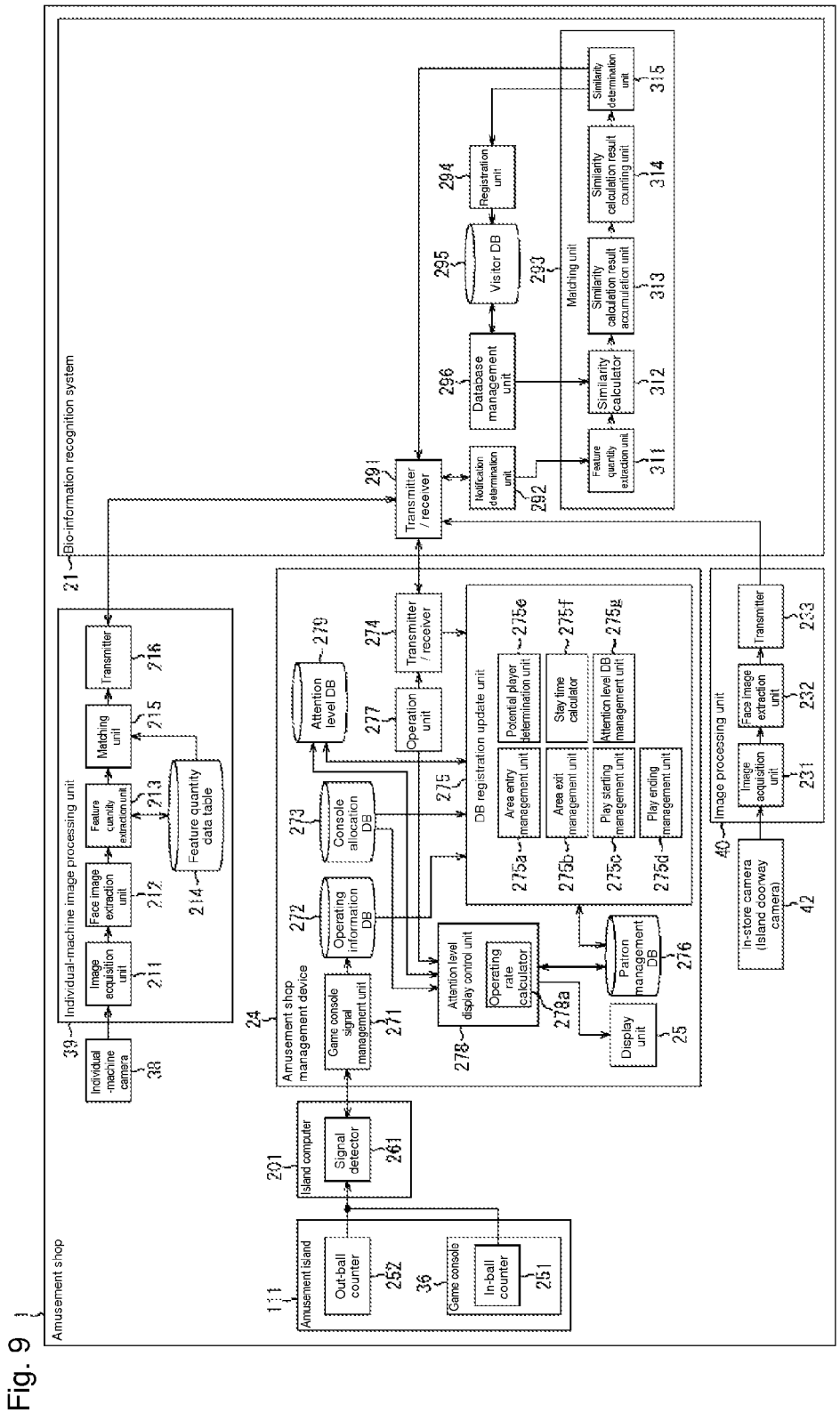
FIG. 9 is a diagram illustrating configuration examples of an image processing unit, a bio-information recognition system, and an amusement shop management device in FIG. 1.

An amusement shop management device 24 is one what is called a hall computer, and the amusement shop management device 24 monitors operations of an in-ball counter 251 and an out-ball counter 252 of the game console 36 in an amusement island facility (island facility or amusement island) 111 (FIG. 9) through an amusement shop management information bus 30 and an island facility management computer (island computer) 201 (FIG. 9). The amusement shop management device 24 performs predetermined processing and displays a processing result on a display unit 25 including the organic EL or the LCD according to information on the number of balls acquired by the player or the number of payout medals in each game console 36, the number of out balls, which is the number of balls discharged without entering a prize winning port, players call information on each of the game consoles 36-1 to 36-m, and a monitoring state such as error generation. Using a game console management DB 26, the amusement shop management device 24 manages pieces of information supplied from a counting machine 35, the game consoles 36-1 to 36-m, and game console peripheral terminals 37-1 to 37-m while correlating each of the pieces of information with identification information (for example, a game console identification number) identifying each game console 36.

Using a medium lending management DB 29, the medium lending management device 27 manages medium lending management information on a lent amusement medium based on pieces of information from an adjustment/vending machine 33 and a lending machine 34. When the medium lending management information registered in the medium lending management DB 29 is updated, the medium lending management device 27 transmits the updated information to the third-party amusement shop management center 2 through the third-party amusement shop management bus 4 and the public communication line network 5. The medium lending management device 27 obtains the medium lending management information supplied from the third-party amusement shop management center 2 through the third-party amusement shop management bus 4 and the public communication line network 5, and accumulates the medium lending management information in the medium lending management DB 29.

In the case that the player plays the game console 36, the lending machine 34 lends the amusement medium to the player according to a predetermined amount of money when receiving the amount of money in cash or by a prepaid card. At this point, the lending machine 34 supplies information on the number of lent amusement mediums to the medium lending management device 27 together with information on the received amount of money or a balance of the prepaid card. Therefore, the medium lending management device 27 registers the information on the number of lent amusement mediums in the medium lending management database 29 together with the information on the received amount of money or the balance of the prepaid card.

The adjustment/vending machine 33 sells the prepaid card with units to borrow the ball. At this point, the adjustment/vending machine 33 supplies the units of the sold prepaid card and the amount of paid money to the medium lending management device 27. The adjustment/vending machine 33 adjusts an account and pays money based on the balance of the amusement medium that is lent as the units of the prepaid card. At this point, the adjustment/vending machine 33 supplies the balance of the prepaid card and the amount of refunded money to the medium lending management device 27.

The counting machine 35 counts the number of amusement mediums acquired by the player in playing the game console 36, and outputs a counting result in the form of a magnetic card or a receipt.

The player performs a predetermined manipulation to cause each of the game consoles 36-1 to 36-$m$ to perform the game, and each of the game consoles 36-1 to 36-$m$ pays the game ball or the medal according to what is called a small hit or a big hit.

The game console peripheral terminals 37-1 to 37-$m$ are what are called inter-machine devices that are provided according to the game consoles 36-1 to 36-$m$, and an inter-machine vending machine (identical to the lending machine 34 in principle) is provided according to each of the game consoles 36-1 to 36-$m$. The game console peripheral terminal 37 obtains the bio-information on the face image of the player who plays the game console 36, and the game console peripheral terminal 37 transmits the bio-information to the bio-information recognition system 21 together with the game console identification information (the game console identification number). In FIG. 1, by way of example, the individual-machine cameras 38-1 to 38-$m$ that capture the face image of the player are provided as a function of obtaining the bio-information in the game consoles 36.

The entrance cameras 41-1 to 41-$p$ and the in-store cameras 42-1 to 42-$q$ are installed at doorways and predetermined sites in the amusement shop 1, and supply the captured images to the image processing units 40-1 to 40-$(p+q)$, respectively.

Figure 2:
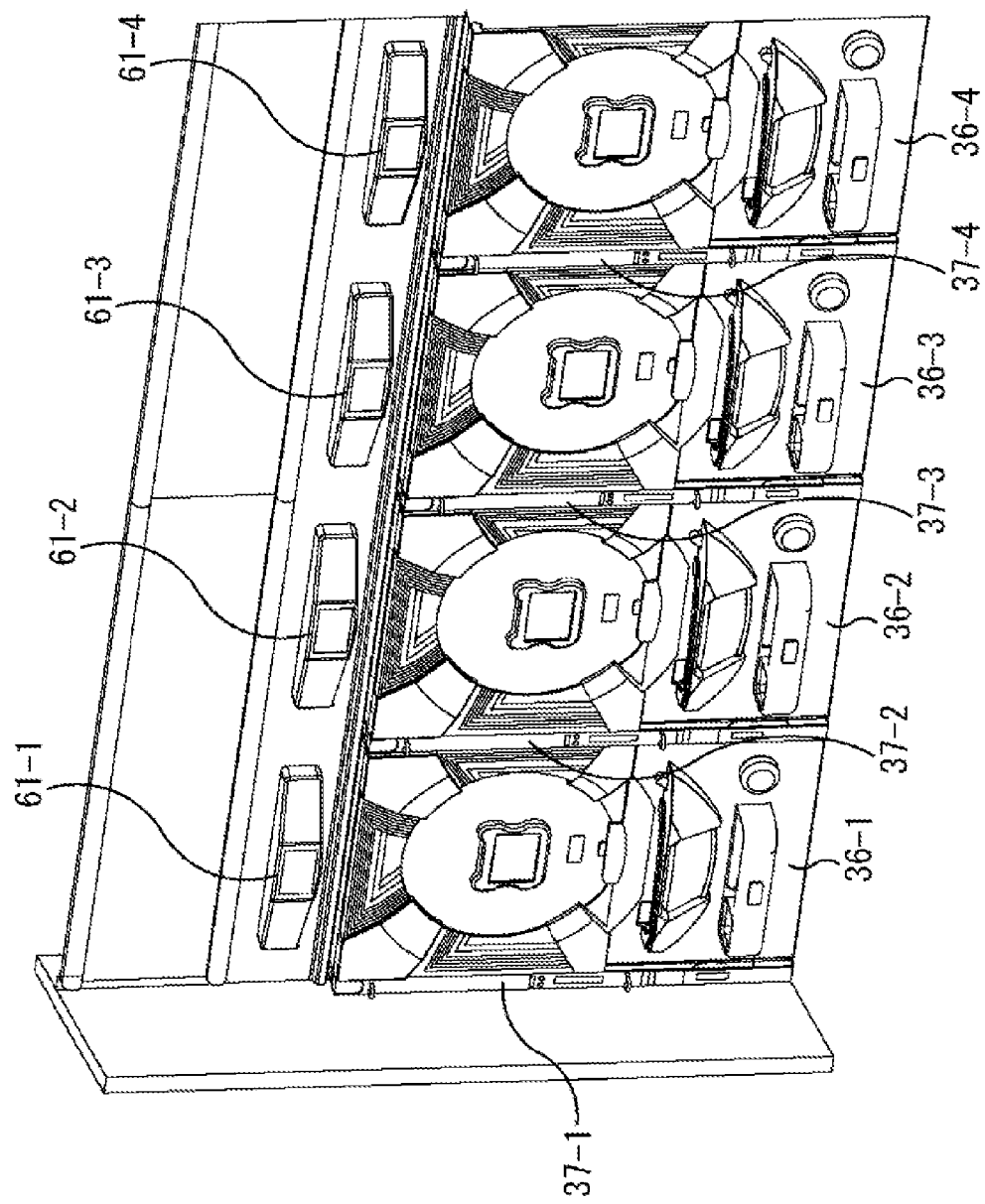
FIG. 2 is a view illustrating an installation example of cameras in FIG. 1.
Figure 3:
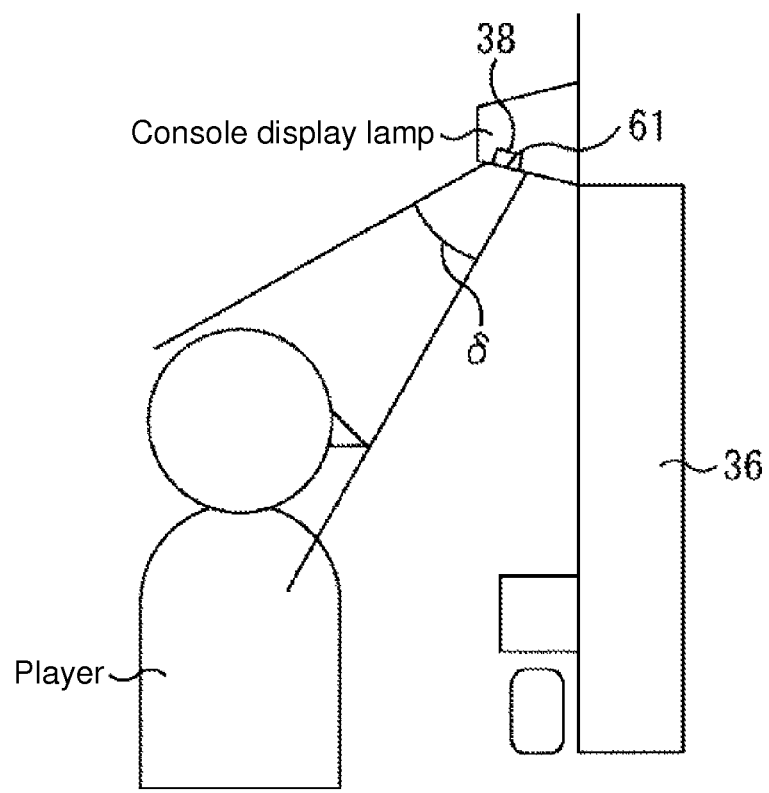
FIG. 3 is a view illustrating an installation example of the camera in FIG. 1.

For example, the individual-machine cameras 38-1 to 38-$m$ may be provided below machine display lamps 61-1 to 61-4 provided in upper portions of the game consoles 36-1 to 36-4 as illustrated in FIG. 2 such that the face image of the player is captured within a read range θ as illustrated in FIG. 3. Therefore, each camera ID can simultaneously be used as a game console ID.

Figure 4:
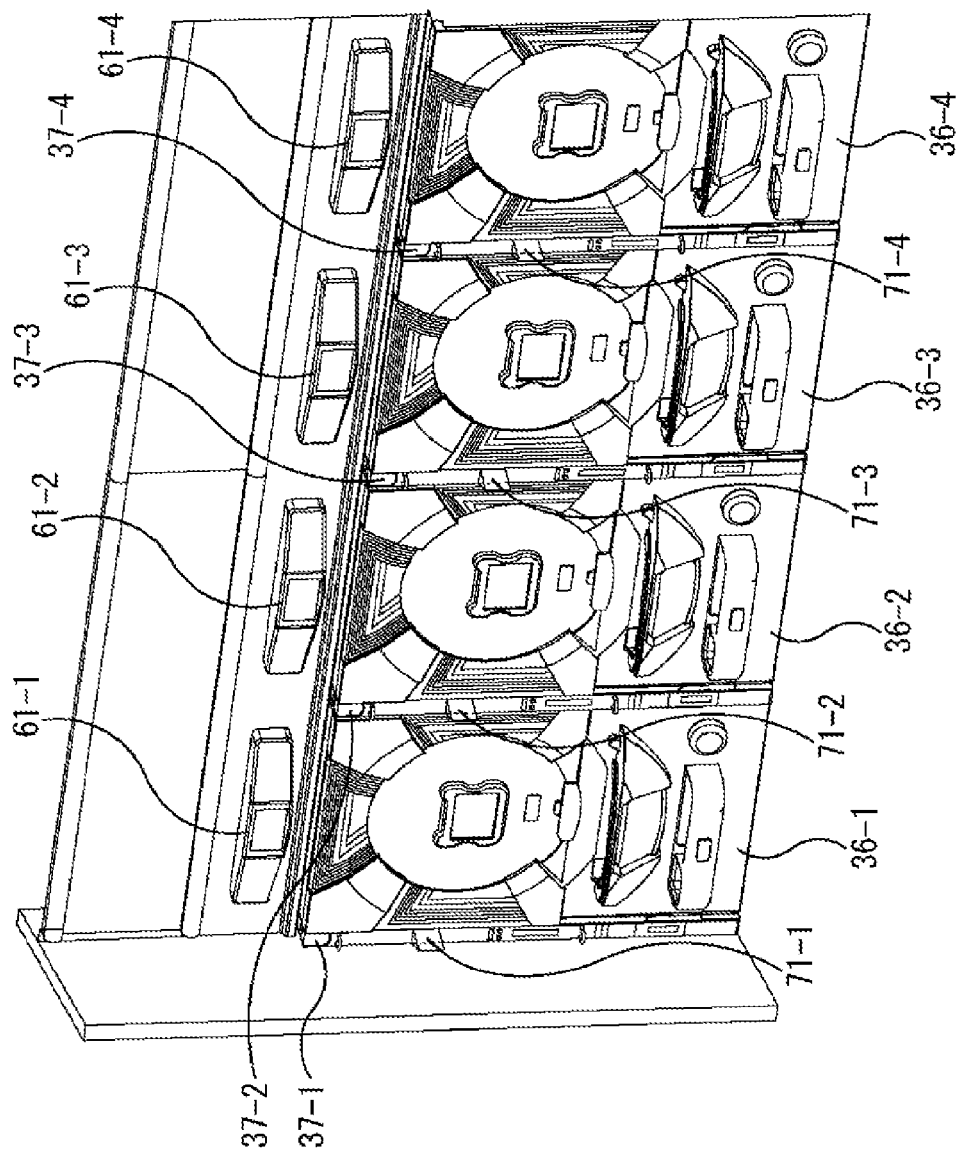
FIG. 4 is a view illustrating an installation example of the cameras in FIG. 1.
Figure 5:
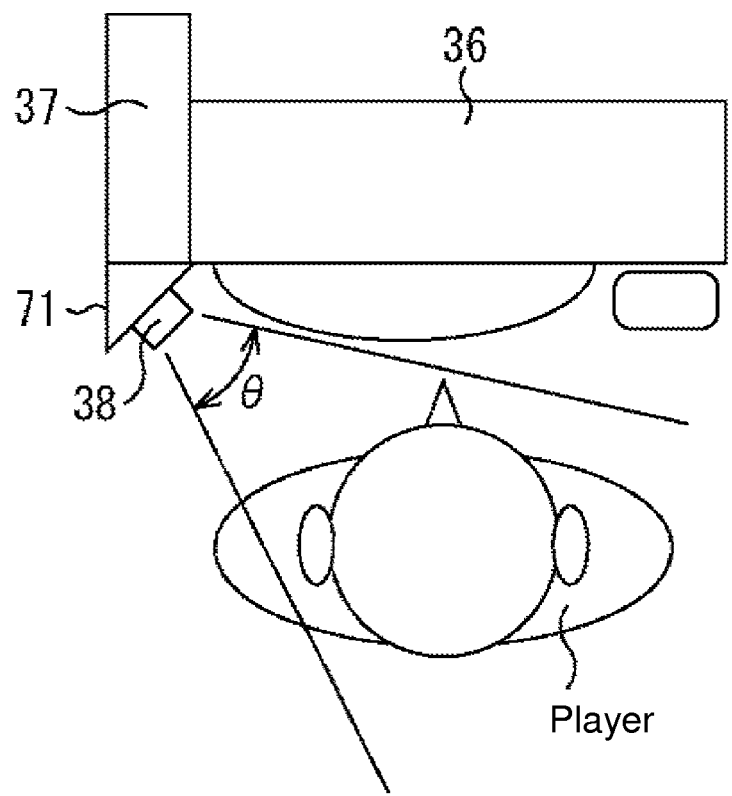
FIG. 5 is a view illustrating an installation example of the camera in FIG. 1.

For example, in the individual-machine cameras 38-1 to 38-$m$, projections 71-1 to 71-4 may be provided in the game console peripheral terminals 37-1 to 37-4 as illustrated in FIG. 4 such that the face image of the player is captured within a read range θ as illustrated in FIG. 5.

Figure 6:
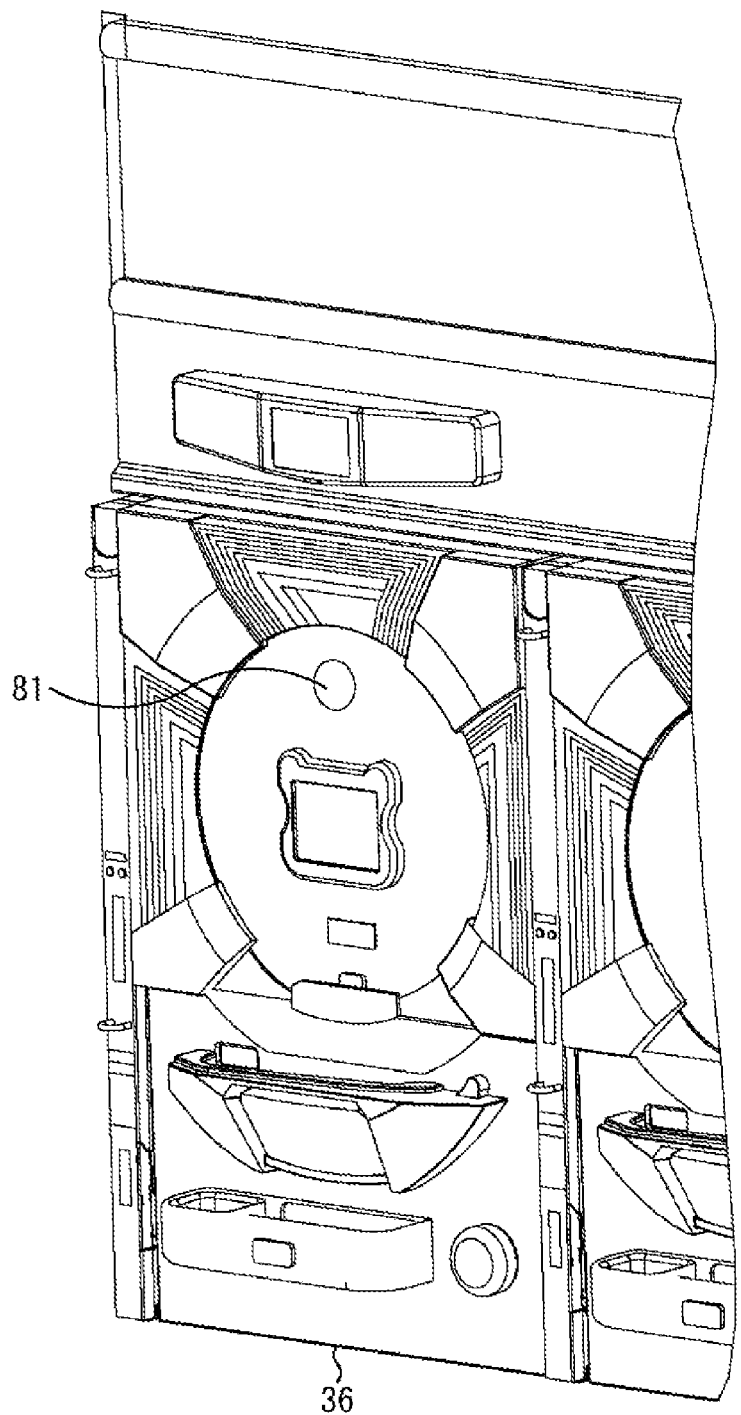
FIG. 6 is a view illustrating an installation example of the camera in FIG. 1.
Figure 7:
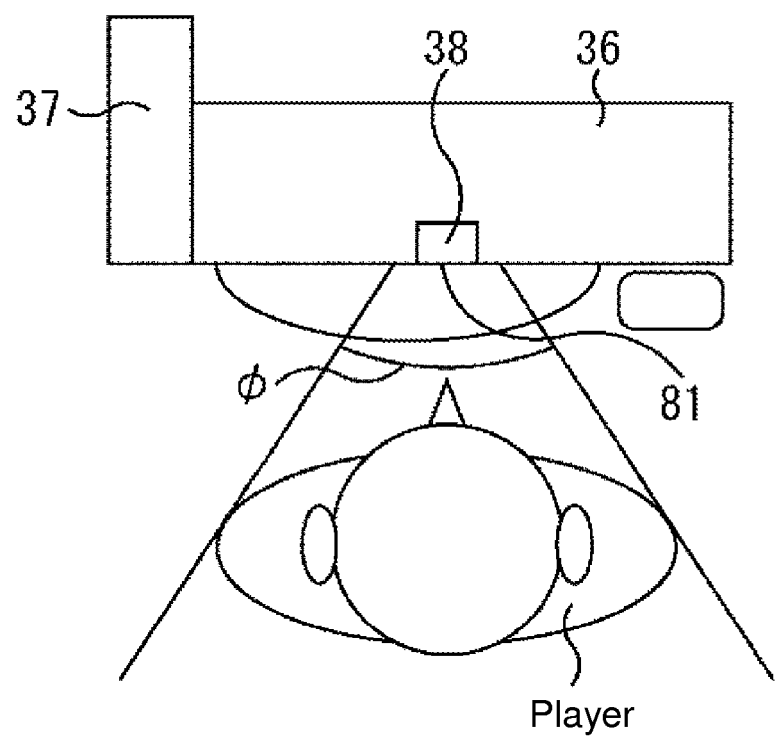
FIG. 7 is a view illustrating an installation example of the camera in FIG. 1.

For example, as illustrated in FIG. 6, the face image of the player may be captured while the individual-machine cameras 38-1 to 38-$m$ are provided in a central portion (on a board of the game console 36) of the game console 36. That is, the individual-machine camera 38 is installed in an installation unit 81 in FIG. 6, thereby capturing the face image of the player within a read range φ as illustrated in FIG. 7.

[Installation Positions of Entrance Camera and in-Store Camera]

The entrance cameras 41-1 to 41-$p$ and the in-store cameras 42-1 to 42-$q$ are installed at doorways and predetermined sites in the amusement shop 1, and supply the captured images to the image processing units 40-1 to 40-$(p+q)$, respectively.

Figure 8:
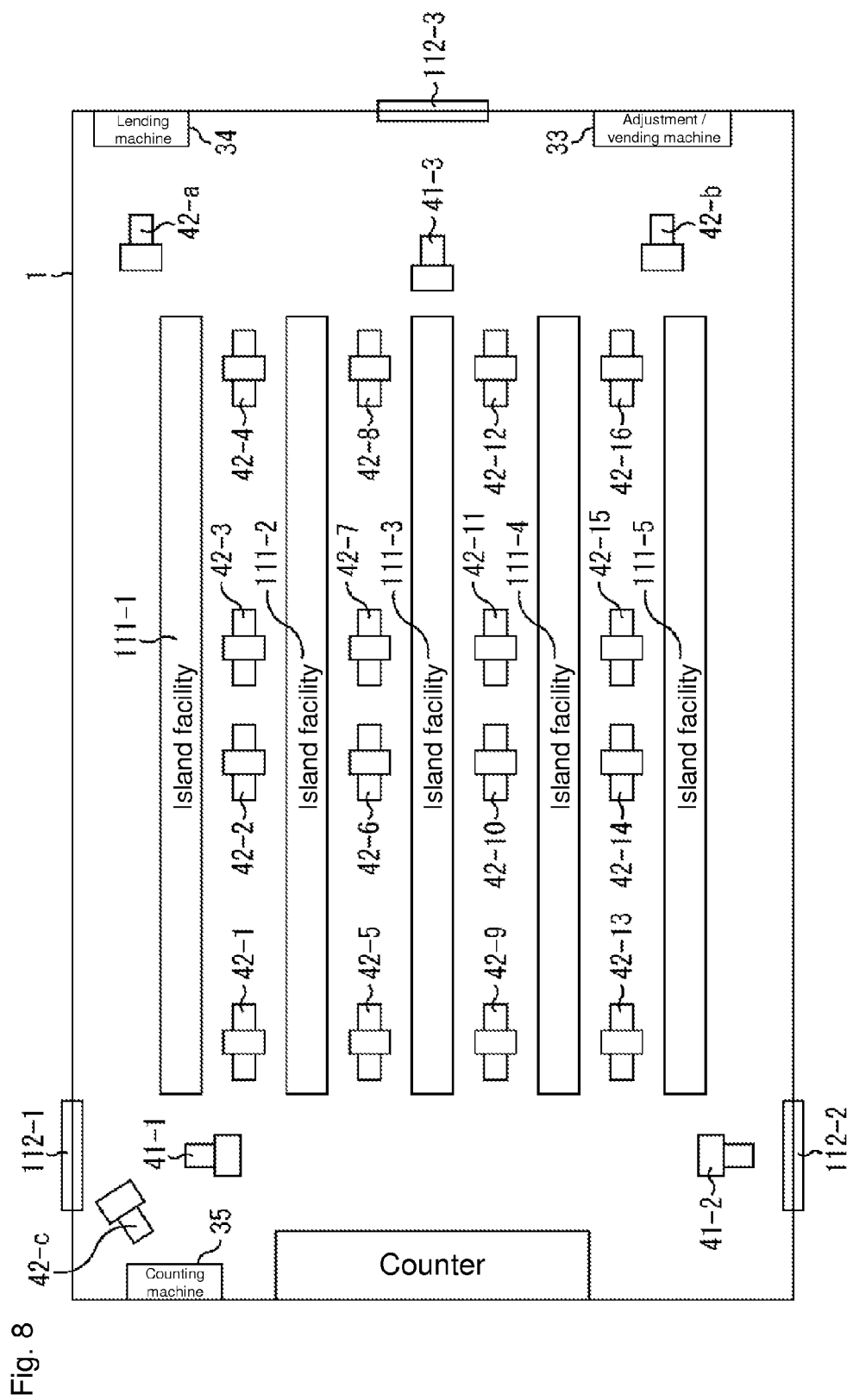
FIG. 8 is a diagram illustrating an installation example of an entrance camera and an in-store camera in FIG. 1.

For example, the entrance cameras 41-1 to 41-$p$ and the in-store cameras 42-1 to 42-$q$ are installed as illustrated in FIG. 8. FIG. 8 illustrates an installation example of the entrance cameras 41-1 to 41-$p$ and the in-store cameras 42-1 to 42-$q$ in the amusement shop 1.

In FIG. 8, doorways 112-1 to 112-3 are provided, and the entrance cameras 41-1 to 41-3 capture the images of the players who enter the amusement shop 1 through the doorways 112, respectively. The in-store cameras 42-1 to 42-16 are provided at positions where entrance and exit of the player to and from areas set by the island facilities 111-1 to 111-5 can be checked, respectively. More specifically, the in-store cameras 42-1 to 42-4 capture the image of the player who enters and exits the areas in the island facilities 111-1 and 111-2. That is, the in-store cameras 42-2 and 42-3 capture the image of the player who enters the area between the island facilities 111-1 and 111-2, and the in-store cameras 42-1 and 42-4 capture the image of the player who exits the area between the island facilities 111-1 and 111-2. Similarly, the in-store cameras 42-5 to 42-8 capture the image of the player who enters and exits the area between the island facilities 111-2 and 111-3. The in-store cameras 42-9 to 42-12 capture the image of player who enters and exits the area between the island facilities 111-3 and 111-4, and the in-store cameras 42-13 to 42-16 capture the image of the player who enters and exits the area between the island facilities 111-4 and 111-5. The individual-machine camera 38, the entrance camera 41, and the in-store camera 42 have a pan-tilt-zoom function. Therefore, as illustrated in FIG. 8, the in-store cameras 42-1 to 42-16 are disposed, which allows any one of the in-store cameras 42-1 to 42-16 to capture the images of all the players who play the game consoles 36.

The in-store camera 42-$a$ is provided in front of the lending machine 34, the in-store camera 42-$b$ is provided in front of the adjustment/vending machine 33, the in-store camera 42-$c$ is provided in front of the counting machine 35. Therefore, the image of the player who uses the lending machine 34, the adjustment/vending machine 33, and the counting machine 35 can be captured by the in-store cameras 42-$a$, 42-$b$, and 42-$c$, respectively.

That is, the individual-machine camera 38, the entrance camera 41, and the in-store camera 42 are installed in the amusement shop 1 such that almost all behaviors expected to be taken in the amusement shop 1 by players, such as the player who visits the amusement shop 1, the player who plays the game console 36, and the player who uses the lending machine 34, the adjustment/vending machine 33, and the counting machine 35 can be monitored as illustrated in FIG. 8.

[Configuration Example of Function Implemented by Facility in Amusement Shop]

A configuration example of function implemented by the facility in the amusement shop 1 will be described below with reference to FIG. 9.

Each machine image processing unit 39 includes an image acquisition unit 211, a face image extraction unit 212, a feature quantity extraction unit 213, a feature quantity data table 214, a matching unit 215, and a transmitter 216.

The image acquisition unit 211 of the individual-machine image processing unit 39 acquires the image captured by the individual-machine camera 38, and supplies the image to the face image extraction unit 212. The face image extraction unit 212 extracts a rectangular image including the face image in the image supplied from the image acquisition unit 211 using a pattern in which regions constituting a face are disposed. The face image extraction unit 212 supplies the rectangular image to the feature quantity extraction unit 213. The feature quantity extraction unit 213 extracts a feature quantity used to identify the face image, and supplies the feature quantity to the matching unit 215 and the feature quantity data table 214 together with the face image. The feature quantity data table 214 stores the feature quantity extracted from the face image of the last frame while correlating the feature quantity with a frame number, and the feature quantity data table 214 supplies the feature quantity to the matching unit 215. The matching unit 215 obtains the degree of similarity between the feature quantity of the latest frame supplied from the feature quantity extraction unit 213 and the feature quantity obtained from the last frame, matches the face image of the last frame to the face image of the present frame by comparison with a predetermined threshold, determines with respect to the latest frame whether the face image has been newly detected to start the play, whether the identical person is present to continue the play, whether the person who has replaced another person immediately started the play, or whether the person has ended the play, and supplies the information on the feature quantity to the transmitter 216 together with a determination result. The transmitter 216 transmits the face image and a matching result of the matching unit 215 to the bio-information recognition system 21. The transmitter 216 transmits the face image and the determination result to the bio-information recognition system 21 together with the camera ID identifying the individual-machine camera 38 provided in the game console 36.

The image processing unit 40 includes an image acquisition unit 231, a face image extraction unit 232, and a transmitter 233. The image acquisition unit 231 of the image processing unit 40 acquires the image captured by the entrance camera 41 or the in-store camera 42, and supplies the image to the face image extraction unit 232. The face image extraction unit 232 extracts the rectangular image including the face image in the image supplied from the image acquisition unit 231 using a pattern in which regions constituting the face are disposed. The face image extraction unit 232 supplies the rectangular image to the transmitter 233. The transmitter 233 transmits the face image to the bio-information recognition system 21. The transmitter 233 transmits the face image to the bio-information recognition system 21 together with the camera ID identifying where the entrance camera 41 or the in-store camera 42 is provided.

As illustrated in FIG. 8, the plurality of game consoles 36 are provided in the island facility 111, each game console 36 detects the number of prize winning amusement balls using the in-ball counter 251 when the amusement ball enters the prize winning port, and the game console 36 supplies the result to the island facility management computer (island computer) 201 that manages the whole of the island facility. The out-ball counter 252 that counts the number of out balls discharged from each game console 36 without entering the prize winning port is provided in the island facility 111. The out-ball counter 252 supplies the information on the counted number of out balls to the island computer 201. The island computer 201 includes a signal detector 261, and supplies the pieces of information, which are supplied from the game console 36, on the number of in balls supplied from the in-ball counter 251 and the number of out balls supplied from the out-ball counter 252 to the amusement shop management device 24 together with the information identifying the game console 36.

The amusement shop management device 24 includes a game console signal management unit 271, an operating information DB 272, a machine allocation DB 273, a transmitter/receiver 274, a DB registration management unit 275, a patron management DB 276, an attention level display control unit 278, and an attention level DB 279.

Based on the pieces of information, which are supplied from the island computer 201, on the signals indicating the pieces of information on count values of the in-ball counter 251 and the out-ball counter 252 of each game console 36, the game console signal management unit 271 generates operating information of each game console 36 and registers the information of each game console 36 in the operating information DB 272. The machine allocation DB 273 is the database in which the information, which is set by the game console number of the game console 36 and the island facility 111 and indicates the camera capturing the image of the exit or the entrance in the area, is allocated based on the camera ID. The transmitter/receiver 274 receives the matching result of the face image supplied from the bio-information recognition system 21 and information such as away-from-machine detection, identical person detection, and new person detection, and supplies the matching result of the face image and the information to the DB registration updating unit 275.

The DB registration updating unit 275 registers the patron management DB 276 and the attention level DB 279 based on information such as away-from-machine detection, identical person detection, and new person detection, which is supplied from the transmitter/receiver 274, in the patron management DB 276. More particularly, the DB registration updating unit 275 includes an area entry management unit 275a, an area exit management unit 275b, a play starting management unit 275c, a play ending management unit 275d, a potential player determining unit 275e, a stay time calculator 275f, and an attention level DB management unit 275g. The area entry management unit 275a registers information on a clock time when the person of the face image captured by the in-store camera 42 at the entrance in the predetermined area enters the area from the camera ID in the patron management DB 276 while correlating the information on the clock time with a person ID of the authenticated player supplied based on the information on the new person detection. The area exit management unit 275b registers information on a clock time when the person of the face image captured by the in-store camera 42 at the exit in the predetermined area exits the area from the camera ID in the patron management DB 276 while correlating the information on the clock time with the person ID of the authenticated player supplied based on the information on the new person detection.

When the face image captured by the individual-machine camera 38 having the predetermined game console number is detected from the camera ID based on the person ID of the authenticated player supplied based on the information on the new person detection while the play starting management unit 275c presently reads the operating information on the corresponding game console 36 from the operating information DB 272, the play starting management unit 275c registers the clock time information as the play starting information in the patron management DB 276. When the play ending management unit 275d does not read the operating information of the corresponding game console 36 from the operating information DB 272 while the face image captured by the individual-machine camera 38 of the game console 36 having the predetermined game console number is not detected from the camera ID supplied based on the away-from-machine information, the play ending management unit 275d registers the clock time information as the play ending information in the patron management DB 276.

Based on the information which is stored in the patron management DB 276 on the player of the face image captured by the in-store camera 42 at the exit in the predetermined area from the camera ID, the potential player determining unit 275e controls the stay time calculator 275f to calculate a stay time in the area, and determines whether the player is a potential player staying in the area in a state in which the player wants to play but does not play based on whether the player plays the game console 36 installed in the area within the stay time. In the case of the potential player, the attention level DB management unit 275g regards, as an attention console, the game console 36 present in the area to cumulatively add the stay time, thereby calculating an attention level and registering the attention level in the attention level DB 279 for every game console 36.

In the case that the display of the attention level for the model of the specific game console 36 is requested, the operation unit 277 including a keyboard and an operation button is operated to receive an instruction for that effect, and the attention level display control unit 278 reads information about the attention level and the number of the potential players for the game console 36 of which attention level is requested to be displayed in the information about the attention level registered in the attention level DB 279, and displays, on the display unit 23, a proper attention level for examining the replacement of the game console 36. In this case, the attention level display control unit 299 controls the operating rate calculator 299a to calculate a corresponding operating rate to the game console 36 of which attention level is requested to be displayed, thereby displaying, on the display unit 25, the operating rate together with the attention level.

When acquiring the face image and various notifications, which are supplied from the individual-machine image processing unit 39 and the image processing unit 40, the transmitter/receiver 291 of the bio-information recognition system 21 supplies the face image and various notifications to the notification determination unit 292. The transmitter/receiver 291 transmits various face images and notifications, which are supplied from the notification determination unit 292 and the matching unit 293, to the amusement shop management device 24. The notification determination unit 292 determines whether the notification supplied from the transmitter/receiver 291 is the away-from-machine detection, the identical person detection, or the person detection. In the case of the away-from-machine notification, the notification determination unit 292 controls the transmitter/receiver 291 to transmit the information to the amusement shop management device 24. In the case of the person detection, the notification determination unit 292 supplies the information on the person detection to the matching unit 293.

The matching unit 293 registers the information on the face image supplied by the person detection in the visitor DB 295, matches the face image to those of the persons registered in the visitor DB 295, and transmits the matching result to the amusement shop management device 24 from the transmitter/receiver 291 together with the person ID. More particularly, the matching unit 293 includes a feature quantity extraction unit 311, a similarity calculator 312, a similarity calculation result accumulation unit 313, a similarity calculation result counting unit 314, and a similarity determination unit 315. The feature quantity extraction unit 311 extracts various feature quantities necessary for the face image matching from the face image, and supplies the face image to the similarity calculator 312 together with the extracted feature quantities. Based on the feature quantities of all the face images, which are supplied by the database management unit 296 and registered in the visitor DB 295, and the feature quantities supplied from the feature quantity extraction unit 311, the similarity calculator 312 calculates the degree of similarity and accumulates the degree of similarity in the similarity calculation result accumulation unit 313. The similarity calculation result counting unit 314 supplies the face image having the top degree of similarity in all the degrees of similarity accumulated in the similarity calculation result accumulation unit 313 and the information on the top degree of similarity to the similarity determination unit 315. In the case that the supplied top degree of similarity is higher than a predetermined threshold, the similarity determination unit 315 determines that the face image having the top degree of similarity is matched with the face image registered in the visitor DB 295, and transmits the notification supplied together with the person ID as the new person detection to the amusement shop management device 24 from the transmitter/receiver 291. In the case that the supplied top degree of similarity is not higher than the predetermined threshold, the similarity determination unit 315 determines that the face image having the top degree of similarity is not matched with the face image registered in the visitor DB 295, and supplies the face image to the registration unit 294, newly sets the person ID, registers the new person ID in the visitor DB 295, and transmits the notification supplied together with the registered person ID as the new person detection to the amusement shop management device 24 from the transmitter/receiver 291.

[Face Image Detection Processing of Individual-Machine Image Processing Unit]

Figure 10:
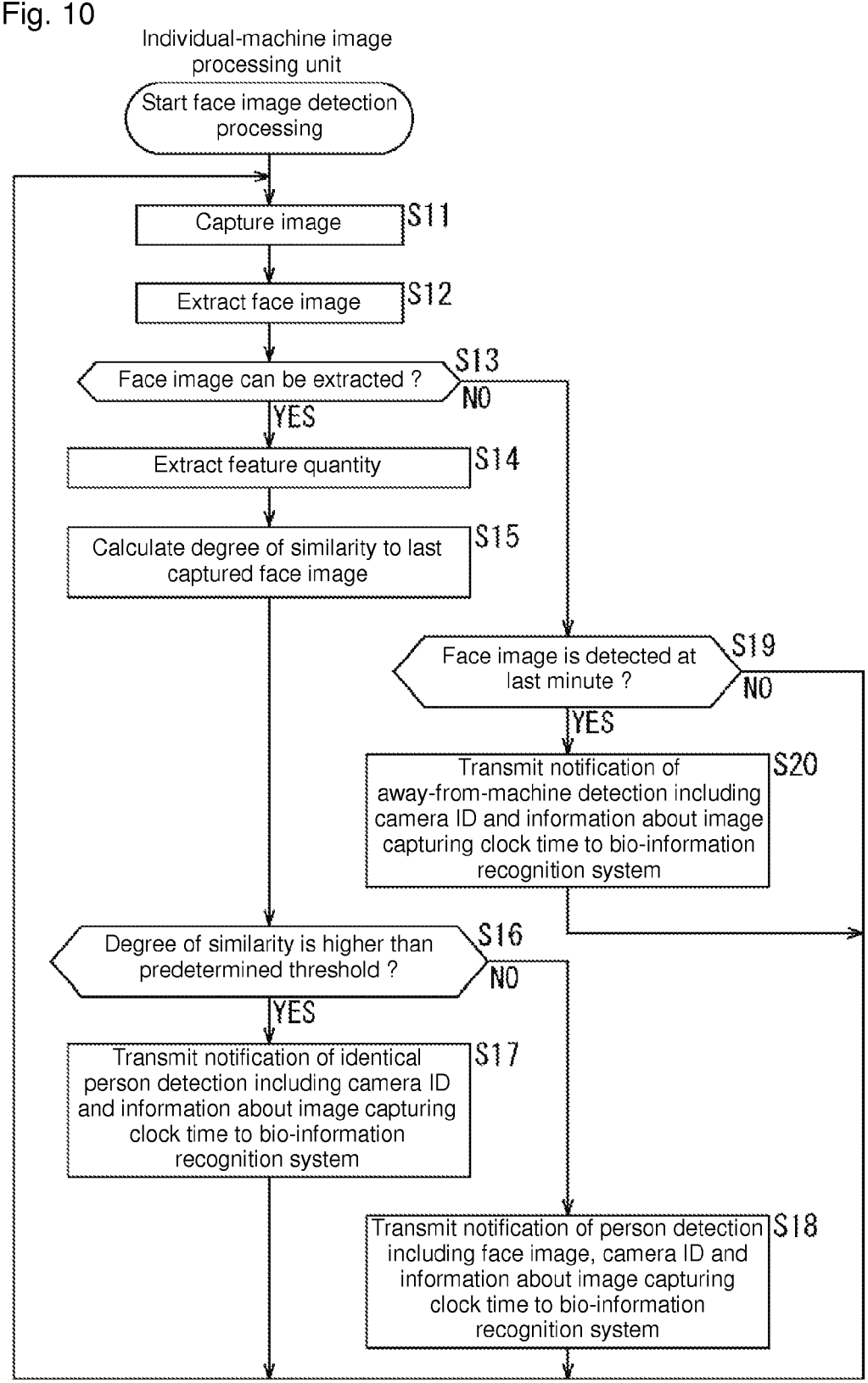
FIG. 10 is a flowchart illustrating face image detection processing of each console image processing unit.

Then, face image detection processing of individual-machine image processing unit 39 will be described with reference to a flowchart in FIG. 10.

In Step S11, the individual-machine camera 38 captures the image in the direction in which the player is present from the installation position, and supplies the captured image to the individual-machine image processing unit 39. The image acquisition unit 211 of the individual-machine image processing unit 39 acquires the supplied image, and supplies the image to the face image extraction unit 212.

In Step S12, the face image extraction unit 212 extracts a rectangular image including the face image in the image supplied from the image acquisition unit 211 using the pattern in which the regions constituting the face are disposed, and the face image extraction unit 212 supplies the rectangular image to the feature quantity extraction unit 213.

In Step S13, the face image extraction unit 212 determines whether the face image can be extracted from the image. When the face image can be extracted in Step S13, the processing goes to Step S14.

In Step S14, the feature quantity extraction unit 213 extracts the feature quantity used to identify the face image, and supplies the feature quantity to the matching unit 215 and the feature quantity data table 214 together with the face image. The feature quantity data table 214 stores the feature quantity extracted from the face image of the last frame while correlating the feature quantity with the frame number, and the feature quantity data table 214 supplies the feature quantity to the matching unit 215.

In Step S15, the matching unit 215 obtains the degree of similarity between the feature quantity of the latest frame supplied from the feature quantity extraction unit 213 and the feature quantity obtained from the previous frame.

When the matching unit 215 determines that the obtained degree of similarity is higher than the predetermined threshold, that the face image of the last frame is matched with the face image of the present frame, and that the presently-captured image of the player is identical to the last image of the player in Step S16, the processing goes to Step S17.

In Step S17, the matching unit 215 controls the transmitter 216 to transmit the notification of the identical person detection indicating that the presently-captured image of the player is identical to the last image of the player to the bio-information recognition system 21. The notification of the identical person detection includes the camera ID identifying the individual-machine camera 38 that has captured the face image, the information on the image capturing clock time, and the information on the face image.

On the other hand, when the matching unit 215 determines that the obtained degree of similarity is not higher than the predetermined threshold and that the presently-captured image of the player is of a new player different from the last frame image of the player in Step S16, the processing goes to Step S18.

In Step S18, the matching unit 215 controls the transmitter 216 to transmit the notification of the person detection indicating that the face image to which the face image matching has not been performed has been detected to the bio-information recognition system 21. The notification of the person detection includes the camera ID identifying the individual-machine camera 38 that has captured the face image, the information on the image capturing clock time, and the information on the face image.

When the face image cannot be extracted in Step S13, the processing goes to Step S19.

In Step S19, the matching unit 215 determines whether the face image has been detected in the last frame based on the information recorded in the feature quantity data table 214. When the face image has been detected, namely, when the player was playing at the last minute, the processing goes to Step S20.

In Step S20, the matching unit 215 controls the transmitter 216 to transmit the notification of the away-from-machine detection indicating that the player having the face image to which the matching has been performed at the last minute has ended the play to leave the game console to the bio-information recognition system 21. The notification of the identical person detection includes the camera ID identifying the individual-machine camera 38 that has captured the face image and the information on the image capturing clock time.

When the face image has not been detected in the last frame in Step S19, the processing in Step S20 is skipped.

Through the above pieces of processing, according to the face image of the player captured by the individual-machine camera 38, the individual-machine image processing unit 39 can transmit the three kinds of notifications, namely, the identical person detection, the person detection, and the away-from-machine detection to the bio-information recognition system 21. The notifications include the camera ID of the camera capturing the image and the image capturing clock time, and the face image as needed basis.

[Face Image Detection Processing of Image Processing Unit]

Figure 11:
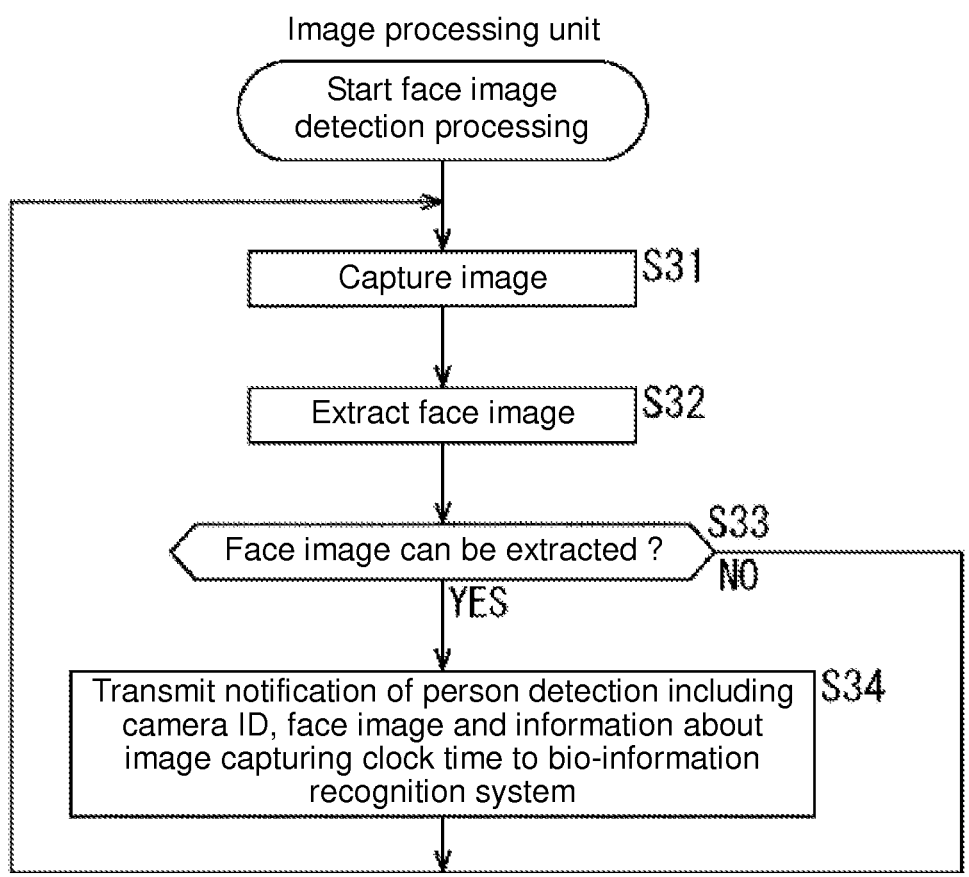
FIG. 11 is a flowchart illustrating face image detection processing of the image processing unit.

Then, face image detection processing of image processing unit 40 will be described with reference to a flowchart in FIG. 11.

In Step S31, the in-store camera 42 captures the image near the entrance or the exit in the area set by the island facility 111 from the installation position, captures the image in the direction in which the player who enters or exits the area presents, and supplies the captured images to the image processing unit 40. The image acquisition unit 231 of the image processing unit 40 acquires the supplied image, and supplies the image to the face image extraction unit 212.

In Step S32, the face image extraction unit 232 extracts the rectangular image including the face image in the image supplied from the image acquisition unit 231 using a pattern in which regions constituting the face are disposed, and the face image extraction unit 232 supplies the rectangular image to the transmitter 233.

In Step S33, the face image extraction unit 232 determines whether the face image can be extracted from the image. When the face image can be extracted in Step S33, the processing goes to Step S34.

In Step S34, the transmitter 233 transmits the notification of the person detection indicating that the face image to which the face image matching has not been performed has been detected to the bio-information recognition system 21. The notification of the person detection includes the camera ID identifying the in-store camera 42 that had captured the face image, the information on the image capturing clock time, and the information on the face image. When the face image cannot be extracted in Step S33, the processing in Step S34 is skipped.

Through the above pieces of processing, the image processing unit 40 can extract the face image of the player who enters or exits each area in which the image has been captured by the in-store camera 42, and transmit the notification of the person detection including the camera ID of the camera that has captured the image, the image capturing clock time, and the face image to the bio-information recognition system 21.

[Bio-Information Recognition Processing]

Figure 12:
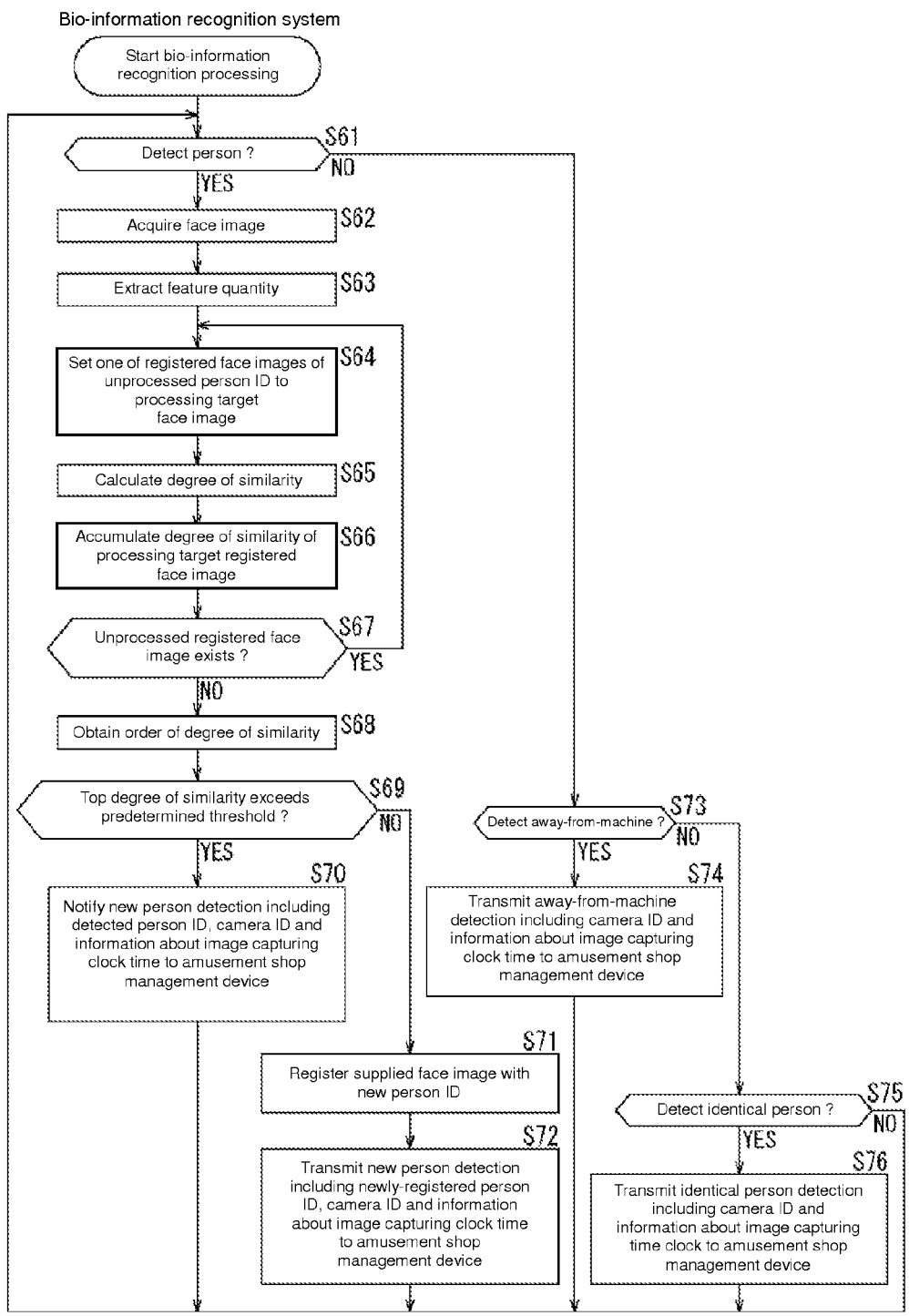
FIG. 12 is a flowchart illustrating bio-information recognition processing.

Bio-information recognition processing performed by the bio-information recognition system 21 will be described below with reference to a flowchart in FIG. 12.

In Step S61, the notification determination unit 292 controls the transmitter/receiver 291 to determine whether the notification of the person detection has been transmitted from the individual-machine image processing unit 39 or the image processing unit 40. In Step S61, when the notification of the person detection has been transmitted from the individual-machine image processing unit 39 or the image processing unit 40 through the processing in Step S18 in FIG. 10 or the processing in Step S34 in FIG. 11 for example, the processing goes to Step S62.

In Step S62, the notification determination unit 292 acquires the transmitted information on the person detection together with the pieces of information on the camera ID, the image capturing clock time, and the face image, which are included in the information on the person detection, and supplies the information on the person detection to the feature quantity extraction unit 311 of the matching unit 293.

In Step S63, the feature quantity extraction unit 311 extracts the feature quantity from the face image attached to the supplied notification of the person detection, and supplies the feature quantity to the similarity calculator 312 together with the information on the person detection.

In Step S64, the similarity calculator 312 controls the database management unit 296 to set the unprocessed face image in the face images of the player registered in the visitor DB 295 to the processing target face image, and to read the unprocessed face image.

In Step S65, the similarity calculator 312 calculates the degree of similarity using the feature quantity of the processing target face image and the feature quantity supplied by the feature quantity extraction unit 311.

In Step S66, the similarity calculator 312 accumulates the information on the calculated degree of similarity in the similarity calculation result accumulation unit 313 while correlating the information on the calculated degree of similarity with the processing target face image, namely, the person ID identifying the processing target face image.

In Step S67, the similarity calculator 312 controls the database management unit 296 to determine whether the unprocessed face image exists in the face images of the player registered in the visitor DB 295. When the unprocessed face image exists in Step S67, the processing returns to Step S64. That is, the pieces of processing in Steps S64 to S67 are repeated until the degree of similarity is obtained for the face images of all the players registered in the visitor DB 295. When the degree of similarity is determined to be obtained for the face images of all the players registered in the visitor DB 295 because the unprocessed face image does not exist in Step S67, the processing goes to Step S68.

In Step S68, the similarity calculation result counting unit 314 obtains order according to the similarity value for all the degrees of similarity stored in the similarity calculation result accumulation unit 313, and supplies the order to the similarity determination unit 315.

In Step S69, the similarity determination unit 315 determines whether the obtained top degree of similarity is higher than a predetermined threshold and whether the face image is matched with the face image of the player registered in the visitor DB 295. When the top degree of similarity is higher than the predetermined threshold and when the face image is matched with the face image of the player registered in the visitor DB 295 in Step S69, the processing goes to Step S70.

In Step S70, the similarity determination unit 315 controls the transmitter/receiver 291 to transmit the new person detection indicating information on the face image in which the matching has been completed to the amusement shop management device 24. The new person detection includes the person ID of the face image of the top degree of similarity, the camera ID of the camera that has captured the face image, and the information on the image capturing clock time.

On the other hand, when the top degree of similarity does not exceed the predetermined threshold and when the notified face image for person detection is not matched with any face images of the player registered in the visitor DB 295 in Step S69, the processing goes to Step S71.

Figure 13:
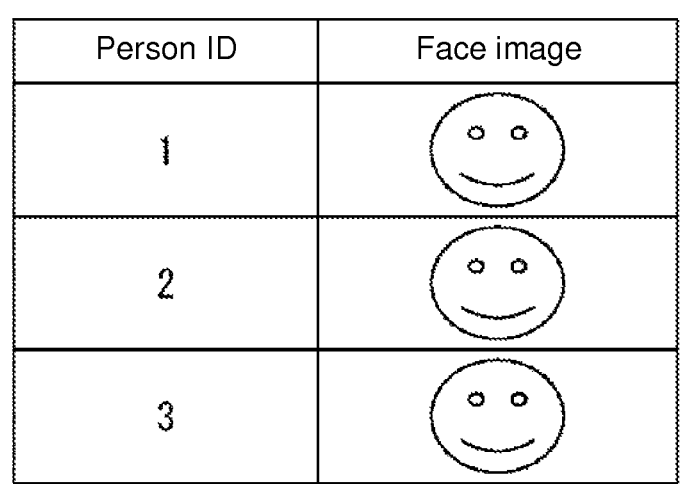

In Step S71, the similarity determination unit 315 supplies the face image supplied as the person detection to the registration unit 294. The registration unit 294 issues the new person ID, registers the new person ID in the visitor DB 295 as illustrated in FIG. 13, and supplies the information on the registered new person ID to the similarity determination unit 315. In FIG. 13, the person ID is registered on the left, and the face image is registered while correlated with the person ID.

In Step S72, the similarity determination unit 315 controls the transmitter/receiver 291 to transmit the new person detection indicating information on the face image in which the matching has been completed to the amusement shop management device 24. The new person detection includes the person ID of the face image that has been newly registered in the visitor DB 295, the camera ID of the camera that has captured the face image, and the information on the image capturing clock time.

When the notification of the person detection has not been transmitted in Step S61, the processing goes to Step S73.

In Step S73, the notification determination unit 292 determines whether the transmitted notification is the away-from-machine detection. In Step S73, when the transmitted notification is the away-from-machine detection through, for example, the processing in Step S20 in FIG. 10, the notification determination unit 292 controls the transmitter/receiver 291 to transmit the away-from-machine detection including the camera ID and the image capturing clock time to the amusement shop management device 24 in Step S74.

When the transmitted notification is not the away-from-machine detection in Step S73, the notification determination unit 292 determines the notification is the identical person detection in Step S75. In Step S75, when the transmitted notification is the identical person detection through, for example, the processing in Step S17 in FIG. 10, the notification determination unit 292 controls the transmitter/receiver 291 to transmit the identical person detection including the pieces of information on the face image, the camera ID, and the image capturing clock time to the amusement shop management device 24 in Step S76.

When the transmitted notification is not the identical person detection in Step S75, the processing returns to Step S61.

Through the pieces of processing, for the person detection, the face image is matched to the face image of the player registered in the visitor DB 295, and the face image is transmitted as the new person detection to the amusement shop management device 24 while the person ID of the authenticated face image is added to the face image. In the case that the face image is not matched with any players registered in the visitor DB 295, the face image is registered as the new visitor in the visitor DB 295 while the new person ID is added to the face image. For the away-from-machine detection or the identical person detection, the face image is directly transmitted to the amusement shop management device 24.

[Operating Information Management Processing]

Then, operating information management processing of the island facility 111, the island computer 201, and the amusement shop management device 24 will be described with reference to a flow chart in FIG. 14.

In Step S91, the out-ball counter 252 of the island facility 111 determines whether the out ball, which is discharged without entering the prize winning port, is being generated in the amusement balls launched by playing with the game console 36. When the out ball is being generated, the generated out ball is counted, and supplied as the out-ball count to the island computer 201. The signal detector 261 of the island computer 201 stores the out-ball count number counted by the out-ball counter while correlating the out-ball count number with a game console number (machine number) identifying the game console 36.

When the out ball is not counted in Step S91, the processing in Step S92 is skipped.

On the other hand, in Step S101, the game console signal management unit 271 of the amusement shop management device 24 determines whether a predetermined time has elapsed, and repeats the similar processing until the predetermined time elapses. When the predetermined time has elapsed, the processing goes to Step S102.

In Step S102, the game console signal management unit 271 sets the unprocessed game console 36 to the processing target game console 36.

In Step S103, the game console signal management unit 271 makes a request of the count value of the out-ball counter of the processing target game console to the island computer 201.

In response to Step S103, in Step S93, the signal detector 261 of the island computer 201 determines whether the machine number indicating the processing target game console and the count value of the out-ball counter of the processing target game console are requested. When the machine number and the count value are requested through, for example, the processing in Step S103, the processing goes to Step S94.

In Step S94, the signal detector 261 supplies the count value of the out-ball counter, which is supplied by the island facility 111 and stored for each machine number of the game console 36, to the game console signal management unit 271 of the amusement shop management device 24.

In Step S104, the game console signal management unit 271 acquires the supplied information on the count value of the out-ball counter of the processing target game console, and the game console signal management unit 271 stores the information while correlating the information with the machine number identifying the game console 36.

In Step S105, the game console signal management unit 271 determines whether the count value of the out-ball counter of the processing target game console has increased compared with the most-recently-stored count value. When the count value has not increased in Step S105, the processing goes to Step S106.

In Step S106, the game console signal management unit 271 accesses the operating information DB 272 to determine whether the operating information of the processing target game console is presently in play. For example, the operating information DB 272 is one illustrated in FIG. 15. A machine number field, a clock time field indicating the clock time when the data is recorded, and a state field are provided from the left in the operating information DB 272. In FIG. 15, for recording of the game console 36 having the machine number 0001, the play was started at 10:00 on Oct. 1, 2010, and the play was ended at 11:06 on the same day. Accordingly, the determination that the play has been ended for the machine number 0001 is made at the present time. On the other hand, for the game console 36 having the machine number 0002, while the play was started at 12:06 on the same day, the ending of the play has not been recorded. Therefore, in the case that the processing target game console is the game console having the machine number 0002 for example, the play is being continued at the present moment.

When the play is presently being continued in Step S106, the processing goes to Step S107.

In Step S107, the game console signal management unit 271 registers the information indicating the play ending in operating information DB 272, for example, as illustrated in a second row in FIG. 15. That is, the count value of the out-ball counter does not change, but the play starting has been registered. Therefore, the play is determined to be ended at the present moment although the play is determined to have been continued until just before. The game console signal management unit 271 registers the operating information indicating the play ending in the operating information DB 272 together with the clock time information while correlating the operating information with the machine number of the processing target game console. When the operating information of the processing target game console is not presently in play in Step S106, namely, when the play remains in the ended state, the processing in Step S107 is skipped because such a state indicates that the processing target game console is not operated.

In Step S108, the game console signal management unit 271 determines whether the unprocessed game console 36 exists. When the unprocessed game console 36 exists, the processing returns to Step S102.

On the other hand, when the count value of the out-ball counter has increased in Step S105, the processing goes to Step S110.

In Step S110, the game console signal management unit 271 accesses the operating information DB 272 to determine whether the operating information of the processing target game console is presently in play. For example, in the game console 36 having the machine number of 0001, although the count value of the out-ball counter has increased, the play is ended at 11:06 on Oct. 1, 2010, and the operating information indicating that the processing target game console is not presently in play has been recorded. Therefore, it can be considered that the processing target game console has turned to the state of presently in play.

When the operating information of the processing target game console is not the presently playing in Step S110, the processing goes to Step S111.

In Step S111, the game console signal management unit 271 registers the information indicating the play starting in operating information DB 272, for example, as illustrated in a third row in FIG. 15. It is because the count value of the out-ball counter changes, and the play ending is in the registered state, and therefore, although the play has not been determined to be performed until just before, the play is determined to have been started at the present moment. The game console signal management unit 271 registers the operating information indicating the play starting in the operating information DB 272 together with the clock time information while correlating the operating information with the machine number of the processing target game console. When the operating information of the processing target game console is the presently playing in Step S110, namely, when the information indicating that the play has been started remains registered, the processing in Step S111 is skipped because such a state indicates that the processing target game console continues to operate.

When the unprocessed game console does not exist in Step S108, the processing goes to Step S109.

In Step S109, the game console signal management unit 271 returns all the game consoles to the unprocessed state. Then the processing returns to Step S101.

That is, the count value of the out-ball counter is checked at predetermined time intervals for all the game consoles 36, the present operating information is sequentially registered in the operating information DB 272 from the operating information until just before and the present situation of the change of the count value.

[Patron Management DB Management Processing]

Figure 16:
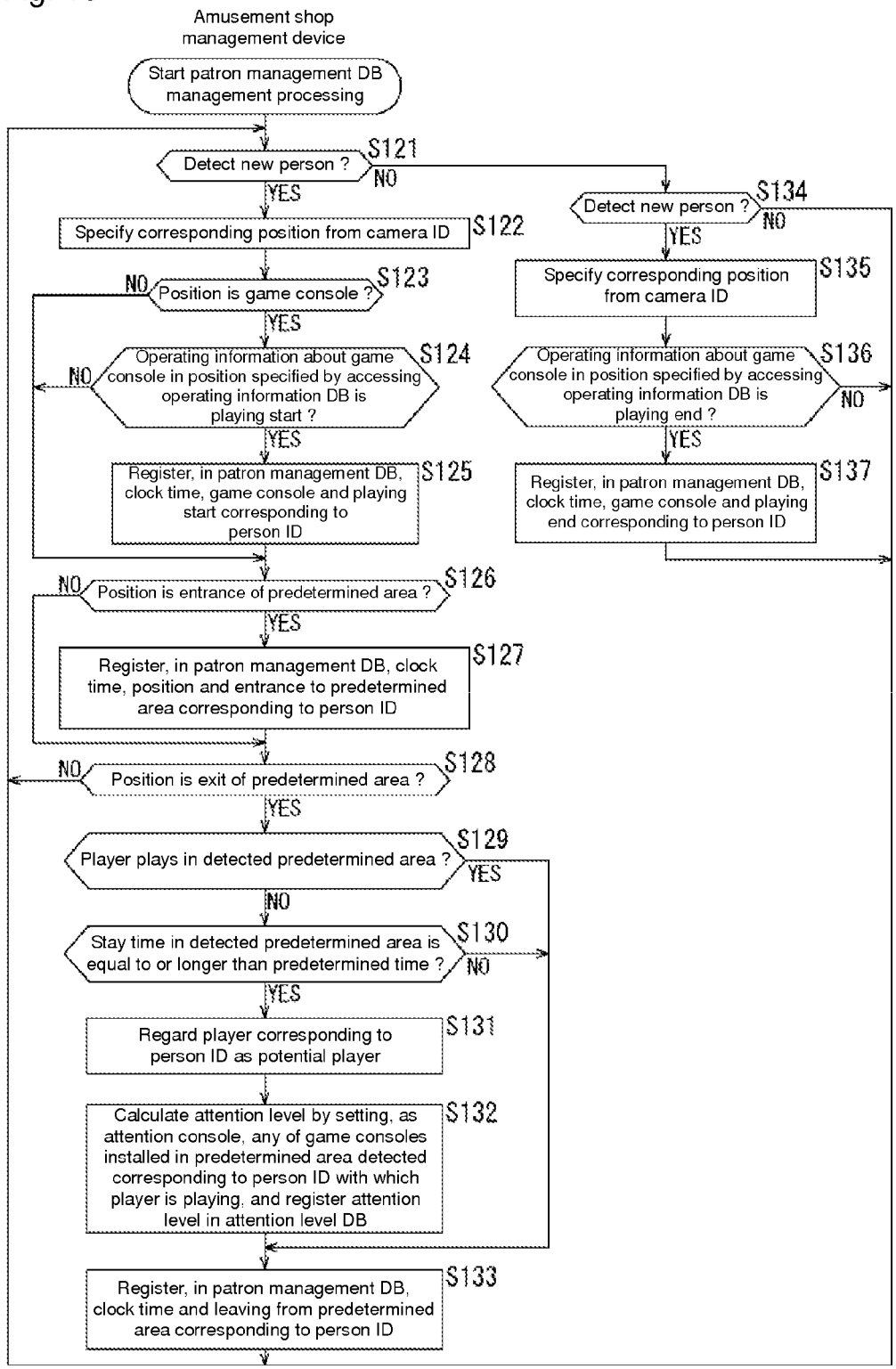
FIG. 16 is a flowchart illustrating patron management DB management processing.

Then, patron management DB management processing of the amusement shop management device 24 will be described with reference to a flowchart in FIG. 16.

In Step S121, the DB management updating unit 275 controls the transmitter/receiver 274 to determine whether the bio-information recognition system 21 has made the notification of the new person detection. In Step S121, when the bio-information recognition system 21 has made the notification of the new person detection through, for example, the processing in Step S70 or S72 in FIG. 12, the processing goes to Step S122.

In Step S122, the DB registration updating unit 275 accesses the machine allocation DB 273 to specify the corresponding position based on the camera ID included in the new person detection. For example, the machine allocation DB 273 is one illustrated in FIG. 17. A camera ID field, an area field, a detail field, a model field, and an area information field are provided from the left in the machine allocation DB 273 in FIG. 17.

As illustrated in the top in FIG. 17, for example, the camera having the camera ID of C1 is the in-store camera 42 provided at the entrance of the first island facility 111 that is a one-yen area. In the second row, the camera having the camera ID of C2 is the in-store camera 42 provided at the exit of the first island facility 111 that is the one-yen area. In the third row, the camera having the camera ID of C3 is the individual-machine camera 38 provided in the model of XXXXX of the machine having the number of 1 in the first island facility 111 that is the one-yen area. In the fourth row, the camera having the camera ID of C4 is the individual-machine camera 38 provided in the model of XXXXX of the machine having the number of 2 in the first island facility 111 that is the one-yen area. In the fifth row, the camera having the camera ID of C5 is the in-store camera 42 provided at the entrance of the second island facility 111 that is a four-yen area. In the sixth row, the camera having the camera ID of C6 is the in-store camera 42 provided at the exit of the second island facility 111 that is of the four-yen area. In the seventh row, the camera having the camera ID of C7 is the individual-machine camera 38 provided in the model of YYYYY of the machine having the number of 3 in the second island facility 111 that is the four-yen area.

Thus, the information on the position of the camera is registered by the information of the machine allocation DB 273 while correlated with the camera ID, so that it can be identified which one of the individual-machine camera 38, the entrance camera 41, or the in-store camera 42 has captured the image.

In Step S123, the play starting management unit 275c determines whether the camera that has captured the face image, which is specified from the camera ID and included in the new person detection, is one of the individual-machine cameras 38 of the game consoles 36.

When the camera that has captured the face image, which is specified from the camera ID and included in the new person detection, is one of the individual-machine cameras 38 of the game consoles 36 in Step S124, the play starting management unit 275c accesses the operating information DB 272 to determine whether the operating information of the corresponding game console 36 is the play starting. In Step S124, for example, as illustrated in the third row in FIG. 15, in the case that the latest information of the game console 36 having the machine number of 0002 is in the state in which the play starting has been registered at 12:06 on Oct. 1, 2010, the processing goes to Step S125 because the game console 36 is determined to be operating.

In Step S125, the play starting management unit 275c registers the information including the clock time information, the machine number of the game console, and the play starting in the patron management DB 276 while correlating the information with the person ID included in the new person detection. For example, the patron management DB 276 is one illustrated in FIG. 18. A person ID field, a clock time field and an area movement history field are provided from the left in the patron management DB 276 in FIG. 18.

The top row indicates that the image of the player having the person ID of P1 was captured by the in-store camera 42 at the entrance of the first island facility 111 at 10:00 on Oct. 1, 2010, and that the player entered the first island facility 111. The second row indicates that the image of the player having the person ID of P1 was captured by the in-store camera 42 at the exit of the first island facility 111 at 10:06 on Oct. 1, 2010, and that the player exited from the first island facility 111. The third row indicates that the image of the player having the person ID of P1 was captured by the in-store camera 42 at the entrance of the second island facility 111 at 10:30 on Oct. 1, 2010, and that the player entered the second island facility 111. The fourth row indicates that the image of the player having the person ID of P1 was captured by the individual-machine camera 38 of the game console 36 having the machine number of 001 at 10:50 on Oct. 1, 2010, and that the player started to play with the game console 36 having the machine number of 001. The fifth row indicates that the image of the player having the person ID of P1 was captured by the in-store camera 42 at the exit of the second island facility 111 at 12:00 on Oct. 1, 2010, and that the player exited from the second island facility 111.

The sixth row indicates that the image of the player having the person ID of P2 was captured by the in-store camera 42 at the entrance of the first island facility 111 at 14:00 on Oct. 1, 2010, and that the player entered the first island facility. The seventh row indicates that the image of the player having the person ID of P2 was captured by the individual-machine camera 38 of the game console 36 having the machine number of 001 at 14:02 on Oct. 1, 2010, and that the player started to play with the game console 36 having the machine number of 001. The eighth row indicates that the image of the player having the person ID of P2 was captured by the in-store camera 42 at the exit of the first island facility 111 at 16:00 on Oct. 1, 2010, and that the player exited from the first island facility.

That is, the clock time, the position, and the behavior history of the player are sequentially accumulated in the patron management DB 276.

When the camera is not one of the individual-machine cameras 38 of the game consoles 36 in Step S123, or when the operating information of the game console 36 is not the play starting in Step S124, the processing in Step S125 is skipped.

In Step S126, the area entry management unit 275a determines whether the camera, which is specified by the camera ID to capture the face image included in the new person detection, is located at the entrance of the predetermined area specified by one of the island facilities 111.

When the camera, which is specified by the camera ID to capture the face image included in the new person detection, is the in-store camera 42 that captures the entrance of the predetermined area specified by one of the island facilities 111 in Step S126, the processing goes to Step S127.

In Step S127, for example, in the case that the image of the entrance of the area of the first island facility 111 is captured as illustrated in the top row of FIG. 18, the area entry management unit 275a registers the information including the clock time information and the fact that the player approached the predetermined area to enter the same in the patron management DB 276 while correlating with the person ID included in the new person detection.

When the camera, which is specified by the camera ID to capture the face image included in the new person detection, is not the in-store camera 42 that captures the entrance of the predetermined area of one of the island facilities 111 in Step S126, the processing in Step S127 is skipped.

In Step S128, the area exit management unit 275b determines whether the camera, which is specified by the camera ID to capture the face image included in the new person detection, is located at the exit of the predetermined area specified by one of the island facilities 111.

When the camera, which is specified by the camera ID to capture the face image included in the new person detection, is located at the exit of the predetermined area specified by one of the island facilities 111 in Step S128, the processing goes to Step S129.

In Step S129, the potential player determining unit 275e accesses the operating information DB 272 to determine whether the player having the person ID included in the new person detection is playing in the area of the camera ID located at the exit of the predetermined area specified by the island facility 111. When the player is playing with one of the game consoles 36 installed in the area in Step S129, the processing goes to Step S133.

When the player has not played with any game consoles 36 provided in the area in Step S129, the processing goes to Step S130.

In Step S130, the potential player determining unit 275e controls the stay time calculator 275f to access the patron management DB 276, and the stay time calculator 275f calculates the stay time from a difference between an entry clock time in the area and an exit clock time from the area. The potential player determining unit 275e determines whether the calculated stay time is longer than a predetermined time. As used herein, the predetermined time means a time necessary for a general player to pass through the area by foot. That is, when the player specified by the ID passes through the area in order to proceed to another area, because the player does not stay in the area longer than the time necessary to pass through the area, whether the player simply passes through the area can be determined. When the stay time is longer than the predetermined time in Step S130, the processing goes to Step S131.

In Step S131, the potential player determining unit 275e regards the player specified by the person ID as a potential player who is interested in the game console 36 in the area but is waiting for a long time as the game console 36 with which the player wants to play is not vacant. In Step S132, therefore, the attention level DB management unit 275g accesses the operating information DB 272 and regards the game console 36 currently played with as an attention console among the game consoles 36 in a corresponding area. Then, the attention level DB management unit 275g accesses the attention level DB 279, adds information about a corresponding point to the stay time of the player determined as the potential player and the number of the potential player to information about the attention level of the game console 36 of the game console number for identifying that the game console 36 is regarded as the attention console of the corresponding area and the number of people, and registers the added information.

In other words, in the case that the player does not play in the area provided with the game console but a stay time in the same area is longer than a predetermined time, the reason why the player stays in the area is that the game console 36 in which the player is interested is not vacant and the player cannot play though the player wants to play, and the corresponding player is regarded as a player who does not play irrespective of a situation in which the player can play, that is, a potential player. Then, the game console present in the area where the potential player passes is set to be the attention console and the corresponding point to the stay time is cumulatively stored as an attention level in the attention level DB 279. The attention level DB 279 is shown in FIG. 19, for example. The attention level DB 279 in FIG. 19 has a date field, a console number field, an attention level field and a number-of-people field from left. In FIG. 19, on Jan. 1, 2011, the game console 36 having a console number of 001 is shown with an attention level of 154 and the number of potential players of 51. Referring to the same day, the game console 36 having a console number of 002 is shown with an attention level of 841 and the number of potential players of 180. Referring to the same day, the game consoles 36 having console numbers of 003 and 004 are shown with attention levels of 256 and 372 and the numbers of potential players of 39 and 119, respectively. When the stay time is X minutes, the attention level may be obtained by cumulative addition of X itself or cumulative addition of a point multiplied by a coefficient A of XA (A is a coefficient). In other words, a degree of attention is numerically converted by the attention level added in proportion to the stay time. Therefore, it is possible to set the degree of attention as an index for a customer attracting ability of the game console 36 which does not appear in an operating rate.

In Step S133, for example, as illustrated in the second row in FIG. 18, the area exit management unit 275b registers the information including the clock time information and the fact that the player left the predetermined area to exit the same in the patron management DB 276 while correlating the information with the person ID included in the new person detection. Then the processing returns to Step S121.

When the position is not the exit of the predetermined area in Step S128, the pieces of processing in Steps S129 to S133 are skipped.

On the other hand, when the notification of the new person detection is not made in Step S121, the processing goes to Step S134.

In Step S134, the DB registration updating unit 275 controls the transmitter/receiver 274 to determine whether the bio-information recognition system 21 has made the notification of the away-from-machine detection. In Step S134, when the bio-information recognition system 21 has made the notification of the away-from-machine detection through, for example, the processing in Step S74 in FIG. 12, the processing goes to Step S135.

In Step S135, the DB registration updating unit 275 accesses the machine allocation DB 273 to specify the corresponding position based on the camera ID included in the new person detection.

In Step S136, the play ending management unit 275d accesses the operating information DB 272 to determine whether the operating information of the corresponding game console 36 is the play ending. In Step S136, for example, as illustrated in the second row in FIG. 15, in the case that the latest information of the game console 36 having the machine number of 0001 is in the state in which the play ending is registered at 11:06 on Oct. 1, 2010, the processing goes to Step S137.

In Step S137, the play ending management unit 275d registers the information including the clock time information, the machine number of the game console, and the play ending in the patron management DB 276 while correlating the information with the person ID included in the away-from-machine detection.

When the bio-information recognition system 21 does not make the notification of the away-from-machine detection in Step S134, or when the play ending management unit 275d accesses the operating information DB 272 to determine that the operating information of the corresponding game console 36 is not the play ending in Step S136, the processing returns to Step S121.

Through the above pieces of processing, the patron management DB 275 illustrated in FIG. 18 and the attention level DB 279 illustrated in FIG. 19 are sequentially accumulated based on the newest information. Therefore, it is possible to cumulatively register information about when and where each player enters or exits the area, and from when to when the player plays with the game console 36, and the attention level of the potential player in each game console 36.

[Attention Level Display Processing]

Figure 20:
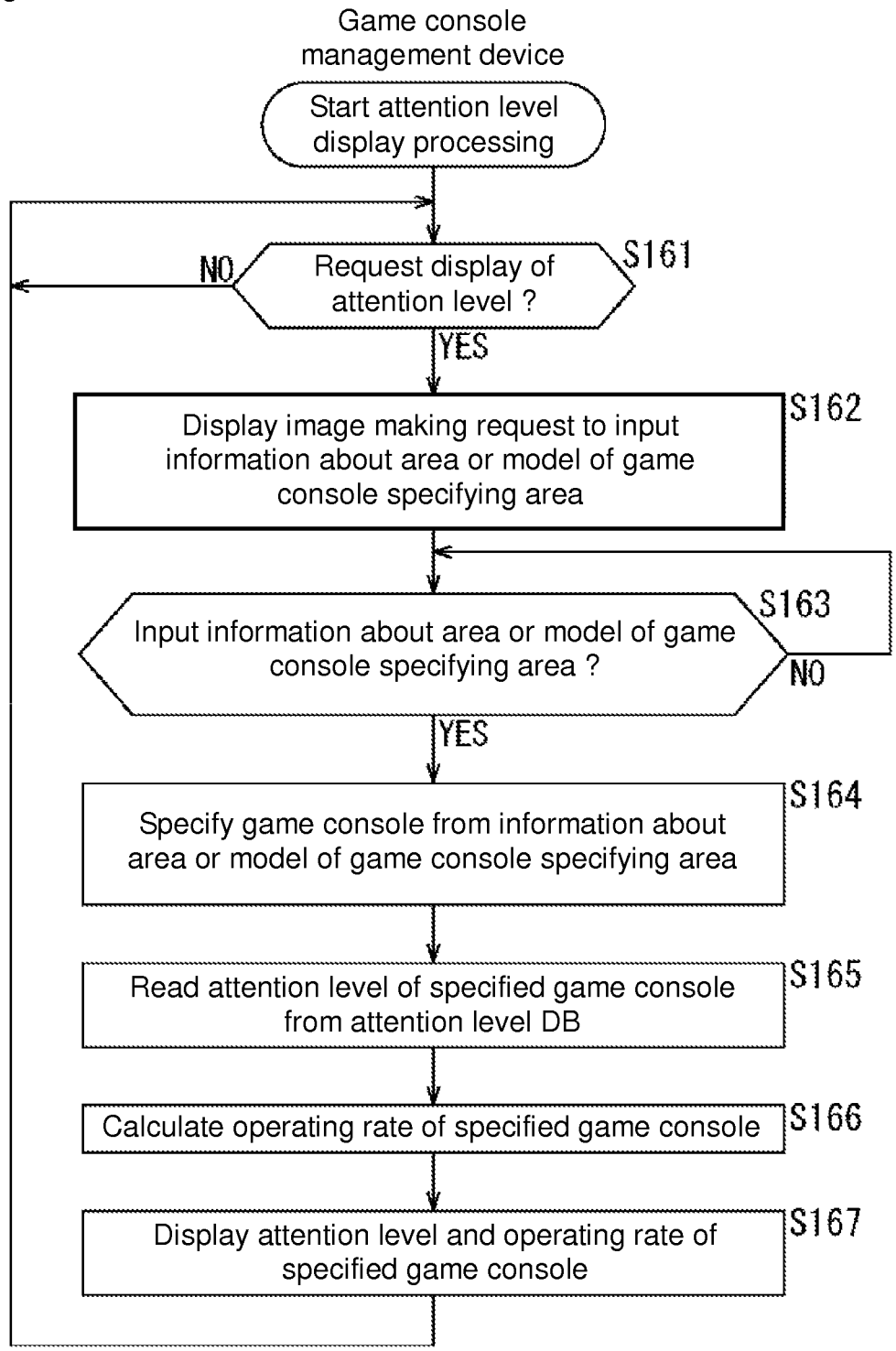
FIG. 20 is a flowchart illustrating attention level display processing.

Next, attention level display processing in the amusement shop management device 24 will be described with reference to a flowchart in FIG. 20.

In Step S161, the attention level display control unit 278 determines whether the operation unit 277 is operated to make the request to display the attention level of the game console on an area unit or a unit of an amusement model specifying an area, and repeats the similar processing until the request is made. When the request to display the attention level is made in Step S161, for example, the processing goes to Step S162.

In Step S162, the attention level display control unit 278 displays the image of the request for inputting the information specifying the area or the model of the game console 36 specifying the area on the display unit 25.

In Step S163, the attention level display control unit 278 determines whether the information specifying the area or the model of the game console 36 specifying the area is input, and repeats the similar processing until the information is input. When the operation unit 277 is operated to input the information specifying the area or the model of the game console 36 specifying the area in Step S163, the processing goes to Step S164.

In Step S164, the attention level display control unit 278 specifies the game console 36 belonging to a specified area based on information specifying an input area or the model of the game console 36 specifying the area.

In Step S165, the attention level display control unit 278 accesses the attention level DB 279 to extract information about the attention level of the game console 36 belonging to the specified area and the number of the potential players in the information about the attention level and the number of the potential players.

In Step S166, the attention level display control unit 278 controls the operating rate calculator 299*a* to calculate the operating rates of all the game consoles 36 belonging to the designated area by utilizing the play starting clock time and the play ending clock time of the game console 36 belonging to the specified area.

In Step S167, the attention level display control unit 278 displays, on the display unit 25, the information about the attention level, the number of the potential players and the calculated operating rate.

Through the above processing, there are displayed the information about the attention level for each game console, the number of the potential players and the operating rate. Therefore, it is possible to simultaneously display, compare and examine the operating rate to be the information about the game console 36 played with actually and the attention level which does not appear in the operating rate. Consequently, it is possible to properly select the game console 36 to be replaced. In other words, in the case of a model having a slightly low operating rate and a high attention level, for example, it is supposed that the advantage produced by the play is not sufficient but a sufficient customer attraction ability is possessed. For this reason, there is a possibility that advantages might be obtained by another model as the whole amusement shop. Therefore, it is also possible to determine that the model is not set to be a replacement target. To the contrary, in the case of a model having some operating rate and a low attention level, there is a possibility that a player who cannot play with a popular model located in the vicinity might simply play without interest because the player cannot play with a desired game console. Therefore, it is also possible to determine that the model is selected as the replacement target model.

Although the description has been given to the example in which the attention level is obtained based on the stay time of the potential player in the area provided with the game console in the amusement shop, it is also possible to define the attention level in the following manner by grasping the game console installed in the amusement shop as resources distributed spatially, for example. In other words, it is also possible to cumulatively store, for every resource, a stay time of a person who wants to utilize a predetermined resource (corresponding to the potential player) staying in a vicinal region of a predetermined resource during the utilization by other resource users without utilizing the predetermined resource, thereby regarding the cumulatively stored stay time as an attention level. The stay in the vicinal region of the predetermined resource which is being utilized by the other resource users may be regarded as an action for performing examination at a predetermined frequency or more or requiring a predetermined cost or more to perform the examination in a state in which the resource is not utilized, for example. In other words, the attention level is expressed by adding a stay time that the potential player continuously waits for a play enabling state in the vicinity of the game console. In this case, the attention level indicates a degree of interest in the game console. Also in the case that a corresponding target to the game console is grasped as the resources distributed spatially, accordingly, it is sufficient that the attention level represents a corresponding target to a game console which is being played with by other players, that is, a degree of interest of the user for the resource which is being utilized by other resource users. If the attention level can be thus obtained to represent the degree of interest of the user for the target, the target may be the resource or a thing other than the game console.

The above sequence of pieces of monitoring processing can be performed by either hardware or software. In the case that the sequence of pieces of processing is performed by the software, a program constituting the software is installed from a recording medium to a computer incorporated in dedicated hardware or a general-purpose personal computer in which various functions can be performed by installing various programs.

Figure 21:
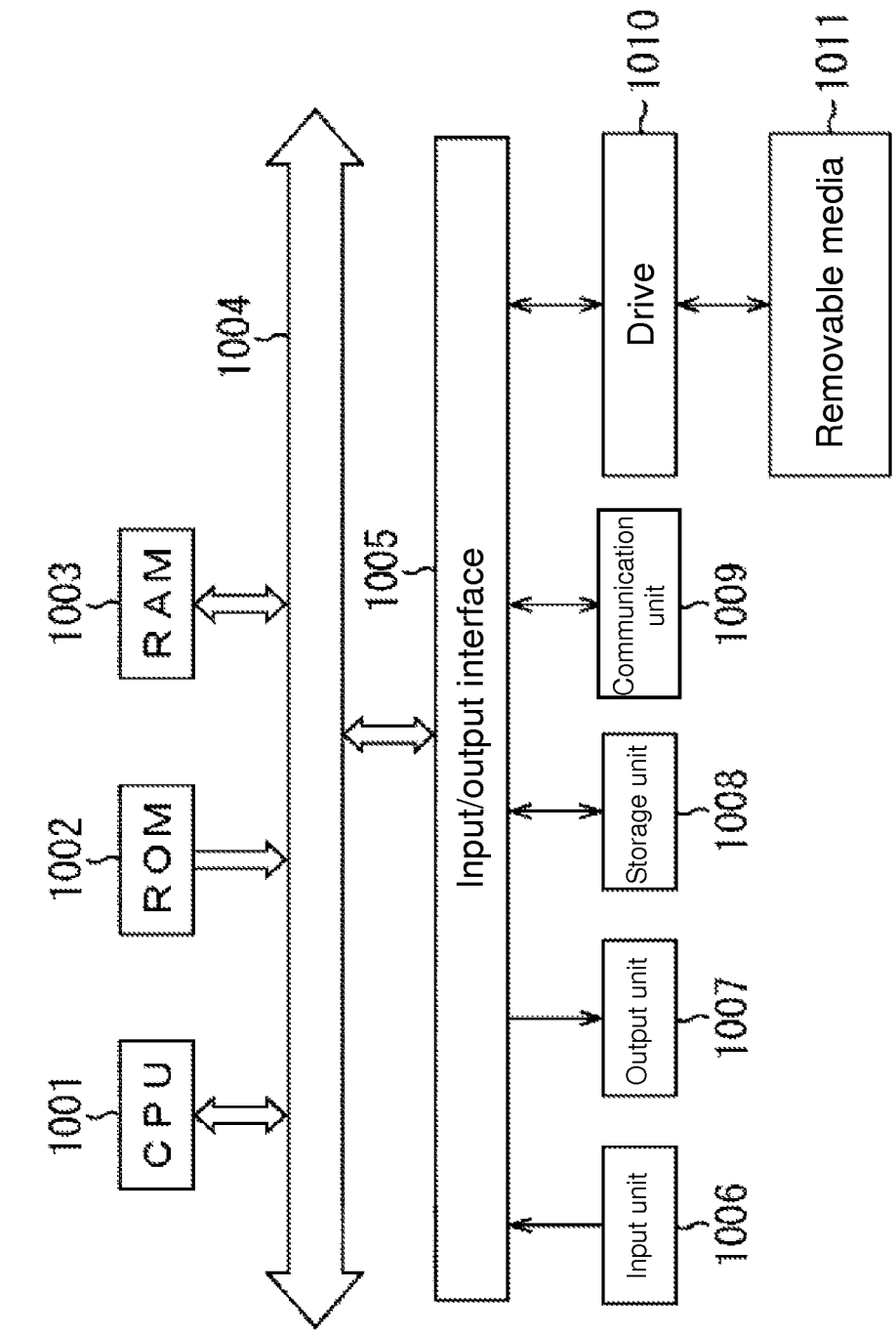
FIG. 21 is a diagram illustrating a configuration example of a personal computer.

FIG. 21 illustrates a configuration example of the general-purpose personal computer. The personal computer is provided with a CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

An input unit 1006, an output unit 1007, a storage unit 1008, and a communication unit 1009 are connected to the input/output interface 1005. The input unit 1006 includes input devices, such as the keyboard and the mouse, through which the user inputs an operating command. The output unit 1007 outputs the image of a processing operating screen or a processing result to the display device. The storage unit 1008 includes a hard disk drive in which the program and various pieces of data are stored. The communication unit 1009 includes a LAN (Local Area Network) adapter to perform communication processing through the network typified by the Internet. A drive 1010 is connected to the input/output interface 1005. The drive 1010 reads and writes the data from and in removable mediums 1011, such as a magnetic disk (including a flexible disk), an optical disk (including a CD-ROM (Compact Disc-Read Only Memory) and a DVD (Digital Versatile Disc)), a magneto-optical disk (including a MD (Mini Disc)), and a semiconductor memory.

The CPU 1001 performs various pieces of processing according to the program stored in the ROM 1002 or the program, which is read from the removable mediums 1011, such as the magnetic disk, the optical disk, the magneto-optical disk, and the semiconductor memory, installed in the storage unit 1008, and loaded from the storage unit 1008 to the RAM 1003. The data necessary for the CPU 1001 to perform various pieces of processing are properly stored in the RAM 1003.

In the description, the step that describes the program recorded in the recording medium includes not only the processing that is performed in time series in the described order but also the processing that is not necessarily per formed in time series but concurrently or individually performed.

In the description, the system means the whole apparatus including a plurality of apparatuses.

The information processing device in accordance with the first aspect of at least one embodiment of the present invention comprises a game console image capturing unit configured to capture an image of a player who plays with a game console at each game console installed in an amusement shop, an area image capturing unit configured to capture the image of the player who enters or exits an area where a plurality of game consoles is provided or an island facility in units of areas or island facilities, a matching unit configured to match the player with a registrant, the player being captured in the images by the game console image capturing unit and the area image capturing unit, an entry management unit configured to manage an entry clock time of each area for each player who is matched by the matching unit, an exit management unit configured to manage an exit clock time of each area for each player who is matched by the matching unit, a play starting management unit configured to manage a play starting clock time of each game console for each player matched by the matching unit, a potential player determining unit configured to determine whether the player whose entry is managed by the entry management unit and who is matched by the matching unit is a potential player who wants to play with a model of a game console installed in the area but cannot play, based on the play starting clock time of the player which is managed by the play starting management unit, and an attention level calculator configured to calculate an attention level of the game console which is a predetermined model of the game console installed in the amusement shop based on information about the entry clock time and the exit clock time of the player determined as the potential player by the potential player determining unit for the predetermined model.

It is possible to further include a stay time calculator configured to calculate a stay time of the area for each player who is matched by the matching unit based on the entry clock time and the exit clock time, and the potential player determining unit can determine the player as the potential player when the stay time in the area of the player is longer than a predetermined time and the play starting clock time is not registered within the stay time in the area of the player.

The attention level calculator can calculate a sum of the stay time as the attention level, the stay time being obtained from information about the entry clock time and the exit clock time and calculated by the stay time calculator for the player determined as the potential player by the potential player determining unit for the predetermined model of the game console installed in the amusement shop.

The attention level calculator can calculate the sum of the stay time as the attention level, the stay time being obtained by the information about the entry clock time and the exit clock time and calculated by the stay time calculator for the player determined as the potential player by the potential player determining unit for the predetermined model of the game console installed in the amusement shop, based on the information about the entry clock time and the exit clock of the player and game console operating information indicating whether the game console is in operation, concerning the game console that is in operation based on the game console operating information.

It is possible to include a display unit configured to display, on a unit of the predetermined model or a predetermined area unit, the attention level of the game console which is the predetermined model calculated by the attention level calculator.

It is possible to further include a detector configured to detect an out ball in each game console, and the play starting management unit can be caused to manage the play starting clock time of each game console for each player who is matched by the matching unit in such a manner that the detector detects a change of an out ball from a non-presence state to a presence state.

The information processing method in accordance with the first aspect of at least one embodiment of the present invention includes a game console image capturing step of capturing an image of a player who plays with a game console at each game console installed in an amusement shop using a game console image capturing unit configured to capture the image of the player who plays with the game console at each game console installed in the amusement shop, an area image capturing step of capturing the image of the player who enters or exits an area where a plurality of game consoles is provided or an island facility, in units of areas or island facilities using an area image capturing unit configured to capture the image of the player who enters or exits the area where the plurality of game consoles is provided or the island facility in units of areas or island facilities, a matching step of matching the player with a registrant, the player being captured in the images through processing of the game console image capturing step and processing of the area image capturing step using a matching unit configured to match the player with the registrant, the player being captured in the images by the game console image capturing unit and the area image capturing unit, an entry management step of managing an entry clock time of each area for each player who is matched through processing of the matching step using an entry management unit configured to manage the entry clock time of each area for each player who is matched by the matching unit, an exit management step of managing an exit clock time of each area for each player who is matched by processing of the matching step using an exit management unit configured to manage the exit clock time of each area for each player who is matched by the matching unit, a play starting management step of managing a play starting clock time of each game console for each player matched by processing of the matching step using a play starting management unit configured to manage a play starting clock time of each game console for each player who is matched by the matching unit, a potential player determination step of determining whether the player whose entry is managed by processing of the entry management step and who is matched by processing of the matching step is a potential player who wants to play with a model of a game console installed in the area but cannot play, based on the play starting clock time of the player which is managed by processing of the play starting management step using the potential player determining unit configured to determine whether the player whose entry is managed by the entry management unit and who is matched by the matching unit is the potential player who wants to play with the model of the game console installed in the area but cannot play, based on the play starting clock time of the player which is managed by the play starting management unit, and an attention level calculation step of calculating an attention level of the game console which is a predetermined model of the game console installed in the amusement shop based on information about the entry clock time and the exit clock time of the player determined as the potential player by the processing of the potential player determination step for the predetermined model using an attention level calculator configured to calculate the attention level of the game console which is the predetermined model of the game console installed in the amusement shop based on the information about the entry clock time and the exit clock time of the player determined as the potential player by the potential player determining unit for the predetermined model.

The non-transitory computer readable medium storing the program in accordance with the first aspect of at least one embodiment of the present invention causes a computer to execute the following processing, and the computer controls an information processing device including a game console image capturing unit configured to capture an image of a player who plays with a game console at each game console installed in an amusement shop, an area image capturing unit configured to capture the image of the player who enters or exits an area where a plurality of game consoles is provided or an island facility in units of areas or island facilities, a matching unit configured to match the player with a registrant, the player being captured in the images by the game console image capturing unit and the area image capturing unit, an entry management unit configured to manage an entry clock time of each area for each player who is matched by the matching unit, an exit management unit configured to manage an exit clock time of each area for each player who is matched by the matching unit, a play starting management unit configured to manage a play starting clock time of each game console for each player matched by the matching unit, a potential player determining unit configured to determine whether the player whose entry is managed by the entry management unit and who is matched by the matching unit is a potential player who wants to play with a model of the game console installed in the area but cannot play, based on the play starting clock time of the player which is managed by the play starting management unit, and an attention level calculator configured to calculate an attention level of the game console which is a predetermined model of the game console installed in the amusement shop based on information about the entry clock time and the exit clock time of the player determined as the potential player by the potential player determination unit for the predetermined model, and the computer executes the processing comprising a game console image capturing step of capturing the image of the player who plays with the game console at each game console installed in the amusement shop using the game console image capturing unit, an area image capturing step of capturing the image of the player who enters or exits the area where the plurality of game consoles is provided or the island facility using the area image capturing unit, a matching step of matching the player with the registrant, the player being captured in the images through processing of the game console image capturing step and processing of the area image capturing step using the matching unit, an entry management step of managing the entry clock time of each area for each player who is matched through processing of the matching step using the entry management unit, an exit management step of managing the exit clock time of each area for each player who is matched by processing of the matching step using the exit management unit, a play starting management step of managing the play starting clock time of each game console for each player matched by processing of the matching step using the play starting management unit, a potential player determination step of determining whether the player whose entry is managed by the processing of the entry management step and who is matched by the processing of the matching step is the potential player who wants to play with the model of the game console installed in the area but cannot play, based on the play starting clock time managed by the processing of the play starting management step of the player using the potential player determination unit, and an attention level calculation step of calculating the attention level of the game console which is the predetermined model of the game console installed in the amusement shop based on information about the entry clock time and the exit clock time of the player determined as the potential player by the processing of the potential player determination step for the predetermined model using the attention level calculator.

According to the first aspect of at least one embodiment of the present invention, there is captured an image of a player who plays with the game console at each game console installed in an amusement shop, there is captured the image of the player who enters or exits an area where a plurality of game consoles is provided or an island facility in units of areas or island facilities, the player having the image captured is matched with a registrant, an entry clock time of each area is managed for each matched player, an exit clock time of each area is managed for each matched player, a play starting clock time of each game console is managed for each matched player, it is determined whether the player whose entry is managed and who is matched is a potential player who wants to play with a model of a game console installed in the area but cannot play, based on the play starting clock time which is managed for the player, and an attention level of the game console which is a predetermined model of the game console installed in the amusement shop is calculated based on information about the entry clock time and the exit clock time of the player determined as the potential player for the predetermined model.

An attention level calculating device in accordance with the second aspect of at least one embodiment of the present invention includes a stay cumulative time calculator configured to calculate, in a case where a plurality of resources is distributed spatially, for each of the resources, a stay cumulative time as a cumulative time of a stay time for stay in a vicinal region of the resource while not being utilized by a resource user of each of the resources but utilized by another resource user, a utilization cumulative time calculator configured to calculate, for each of the resources, a utilization cumulative time as a cumulative time of a utilization time for which the other resource user utilizes the resource, and an attention level calculator configured to calculate an attention level for each of the resources based on the stay cumulative time calculated by the stay cumulative time calculator and the utilization cumulative time calculated by the utilization cumulative time calculator.

In the information processing device in accordance with the first aspect of at least one embodiment of the present invention, for example, the game console image capturing unit configured to capture the image of the player who plays with the game console at each game console installed in the amusement shop is each individual-machine camera, the area image capturing unit configured to capture the image of the player who enters or exits the area where the plurality of game consoles is provided or the island facility in units of areas or island facilities is the in-store camera, the matching unit configured to match the player with the registrant, the player being captured in the images by the game console image capturing unit and the area image capturing unit, is the matching unit, the entry management unit configured to manage the entry clock time of each area for each player who is matched by the matching unit is the area entry management unit, the exit management unit configured to manage the exit clock time of each area for each player matched by the matching unit is the area exist management unit, the play starting management unit configured to manage a play starting clock time of each game console for each player matched by the matching unit is the play starting management unit, the potential player determining unit configured to determine whether the player whose entry is managed by the entry management unit and who is matched by the matching unit is a potential player who wants to play with a model of a game console installed in the area but cannot play, based on the play starting clock time of the player which is managed by the play starting management unit is the potential player determining unit, and the attention level calculator configured to calculate an attention level of the game console which is a predetermined model of the game console installed in the amusement shop based on information about the entry clock time and the exit clock time of the player determined as the potential player by the potential player determining unit for the predetermined model is an attention level DB management unit.

In other words, in the case that the stay time is longer than the predetermined time, there is no information about the play starting clock time within the stay time and play is performed with any of the game consoles in the area within the stay time based on the stay time for the stay in the area obtained by the area entry management unit and the area exit management unit for each of the players matched by the matching unit and the play starting clock time managed by the play starting management unit, the player is regarded as the potential player and the attention level DB management unit regards, as the attention console, any of the game consoles which is being played with in the area, cumulatively adds the stay time to calculate the attention level, and registers, in the attention level DB, the attention level as the degree of attention for each game console.

As a result, it is possible to obtain the attention level of the potential player who does not actually play but is very likely to want to play for each of the models of the game console. In other words, it is possible to grasp the trend of the potential player who does not actually play with the game console but wants to play. When choosing the model of the game console to be replaced, therefore, it is possible to make reference in order to perform proper selection.

Therefore, it is possible to calculate an attention level of each model of a game console which is proper for examining replacement of the game console and to select the model of the game console to be a replacement target more properly.

The invention claimed is:
1. An information processing device comprising:
  a game console image capturing unit configured to capture an image of a player who plays with a game console at each game console installed in an amusement shop;
  an area image capturing unit configured to capture the image of the player who enters or exits an area where a plurality of game consoles is provided or an island facility in units of areas or island facilities;
  a matching unit configured to match the player with a registrant, the player being captured in the images by the game console image capturing unit and the area image capturing unit;
  an entry management unit configured to manage an entry clock time of each area for each player who is matched by the matching unit;
  an exit management unit configured to manage an exit clock time of each area for each player who is matched by the matching unit;
  a play starting management unit configured to manage a play starting clock time of each game console for each player matched by the matching unit;
  a potential player determining unit configured to determine whether the player whose entry is managed by the entry management unit and who is matched by the matching unit is a potential player who wants to play with a model of a game console installed in the area but cannot play, based on the play starting clock time of the player which is managed by the play starting management unit; and
  an attention level calculator configured to calculate an attention level of the game console which is a predetermined model of the game console installed in the amusement shop based on information about the entry clock time and the exit clock time of the player determined as the potential player by the potential player determining unit for the predetermined model.

2. The information processing device according to claim 1, further comprising: a stay time calculator configured to calculate a stay time of the area for each player who is matched by the matching unit based on the entry clock time and the exit clock time,
  wherein the potential player determining unit determines the player as the potential player when the stay time in the area of the player is longer than a predetermined time and the play starting clock time is not registered within the stay time in the area of the player.

3. The information processing device according to claim 2, wherein the attention level calculator calculates a sum of the stay time as the attention level, the stay time being obtained from information about the entry clock time and the exit clock time and calculated by the stay time calculator for the player determined as the potential player by the potential player determining unit for the predetermined model of the game console installed in the amusement shop.

4. The information processing device according to claim 3, wherein the attention level calculator calculates the sum of the stay time as the attention level, the stay time being obtained by the information about the entry clock time and the exit clock time and calculated by the stay time calculator for the player determined as the potential player by the potential player determining unit for the predetermined model of the game console installed in the amusement shop, based on the information about the entry clock time and the exit clock of the player and game console operating information indicating whether the game console is in operation, concerning the game console that is in operation based on the game console operating information.

5. The information processing device according to claim 1, further comprising a display unit configured to display, on a unit of the predetermined model or a predetermined area unit, the attention level of the game console which is the predetermined model calculated by the attention level calculator.

6. The information processing device according to claim 1, further comprising a detector configured to detect an out ball in each game console,
wherein the play starting management unit manages the play starting clock time of each game console for each player who is matched by the matching unit in such a manner that the detector detects a change of an out ball from a non-presence state to a presence state.

7. An information processing method comprising:

a game console image capturing step of capturing an image of a player who plays with a game console at each game console installed in an amusement shop using a game console image capturing unit configured to capture the image of the player who plays with the game console at each game console installed in the amusement shop;

an area image capturing step of capturing the image of the player who enters or exits an area where a plurality of game consoles is provided or an island facility in units of areas or island facilities using an area image capturing unit configured to capture the image of the player who enters or exits the area where the plurality of game consoles is provided or the island facility in units of areas or island facilities;

a matching step of matching the player with a registrant, the player being captured in the images through processing of the game console image capturing step and processing of the area image capturing step using a matching unit configured to match the player with the registrant, the player being captured in the images by the game console image capturing unit and the area image capturing unit;

an entry management step of managing an entry clock time of each area for each player who is matched through processing of the matching step using an entry management unit configured to manage the entry clock time of each area for each player who is matched by the matching unit;

an exit management step of managing an exit clock time of each area for each player who is matched by processing of the matching step using an exit management unit configured to manage the exit clock time of each area for each player who is matched by the matching unit;

a play starting management step of managing a play starting clock time of each game console for each player matched by processing of the matching step using a play starting management unit configured to manage the play starting clock time of each game console for each player who is matched by the matching unit;

a potential player determination step of determining whether the player whose entry is managed by processing of the entry management step and who is matched by processing of the matching step is a potential player who wants to play with a model of a game console installed in the area but cannot play, based on the play starting clock time of the player which is managed by processing of the play starting management step using a potential player determining unit configured to determine whether the player whose entry is managed by the entry management unit and who is matched by the matching unit is the potential player who wants to play with the model of the game console installed in the area but cannot play, based on the play starting clock time of the player which is managed by the play starting management unit; and an attention level calculation step of calculating an attention level of the game console which is a predetermined model of the game console installed in the amusement shop based on information about the entry clock time and the exit clock time of the player determined as the potential player by processing of the potential player determination step for the predetermined model using an attention level calculator configured to calculate the attention level of the game console which is the predetermined model of the game console installed in the amusement shop based on the information about the entry clock time and the exit clock time of the player determined as the potential player by the potential player determining unit for the predetermined model.

8. A non-transitory computer readable medium storing a program configured to cause a computer to execute processing of the steps of the information processing method according to claim 7.

9. An attention level calculating device comprising:

a stay cumulative time calculator configured to calculate, in a case where a plurality of resources is distributed spatially, for each of the resources, a stay cumulative time as a cumulative time of a stay time for stay in a vicinal region of the resource while not being utilized by a resource user of each of the resources but utilized by another resource user;

a utilization cumulative time calculator configured to calculate, for each of the resources, a utilization cumulative time as a cumulative time of a utilization time for which the other resource user utilizes the resource; and an attention level calculator configured to calculate an attention level for each of the resources based on the stay cumulative time calculated by the stay cumulative time calculator and the utilization cumulative time calculated by the utilization cumulative time calculator.

* * * * *